United States Patent [19]

Iwasaki

[11] Patent Number: 5,779,009

[45] Date of Patent: Jul. 14, 1998

[54] APPARATUS AND METHOD FOR CONTROLLING DAMPING FORCE CHARACTERISTIC OF SHOCK ABSORBER FOR CAB OVER TYPE TRUCK

[75] Inventor: Katsuya Iwasaki, Atsugi, Japan

[73] Assignee: Unisia Jecs Corporation, Atsugi, Japan

[21] Appl. No.: 788,102

[22] Filed: Jan. 23, 1997

[30] Foreign Application Priority Data

Jan. 29, 1996 [JP] Japan ................ 8-013061

[51] Int. Cl.$^6$ ............................................ F16F 9/46
[52] U.S. Cl. .................. 188/299; 280/707; 296/190; 701/37
[58] Field of Search ................ 188/299, 285, 188/287, 288, 315, 318, 319; 280/707, 714; 296/190; 364/424.046, 424.047

[56] References Cited

U.S. PATENT DOCUMENTS

| | | | |
|---|---|---|---|
| 5,044,455 | 9/1991 | Tecco et al. | 188/299 X |
| 5,521,821 | 5/1996 | Shimizu et al. | 188/299 X |
| 5,555,501 | 9/1996 | Furihata et al. | 296/190 X |
| 5,603,387 | 2/1997 | Beard et al. | 296/190 X |
| 5,623,410 | 4/1997 | Furihata et al. | 296/190 X |

FOREIGN PATENT DOCUMENTS

| | | | |
|---|---|---|---|
| 0008009 | 1/1988 | Japan | 188/299 |
| 405131823 | 5/1993 | Japan | 188/299 |
| 405185821 | 7/1993 | Japan | 188/299 |
| 6-78010 | 11/1994 | Japan | |

*Primary Examiner*—Robert J. Oberleitner
*Assistant Examiner*—Pamela J. Lipka
*Attorney, Agent, or Firm*—Foley & Lardner

[57] ABSTRACT

An apparatus for a cab over type truck, comprising: a) at least one shock absorber interposed between a vehicle cab of the truck and a vehicle chassis of the truck and having a damping force characteristic varying member arranged so as to enable a variation in the damping force characteristic of the shock absorber in response to a control signal; b) a vertical behavior sensor arranged on the vehicle chassis of the truck for detecting a vertical behavior on the chassis; and c) a control unit arranged for estimating the vertical behavior on the cab of the truck from the detected vertical behavior on the chassis, and providing a control signal for the shock absorber so as to control the damping force characteristic of the shock absorber on the basis of the estimated vertical behavior on the cab of the truck.

23 Claims, 17 Drawing Sheets

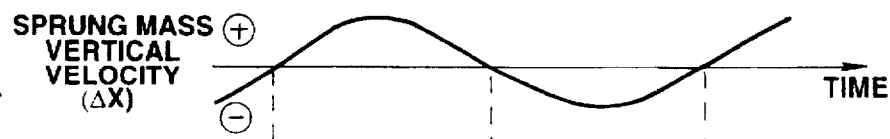
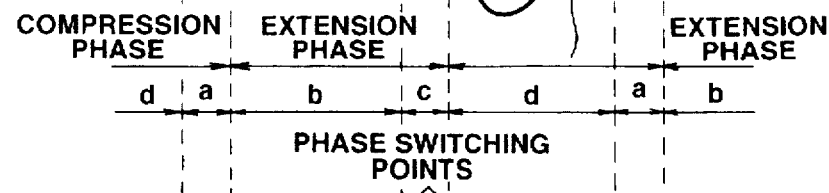
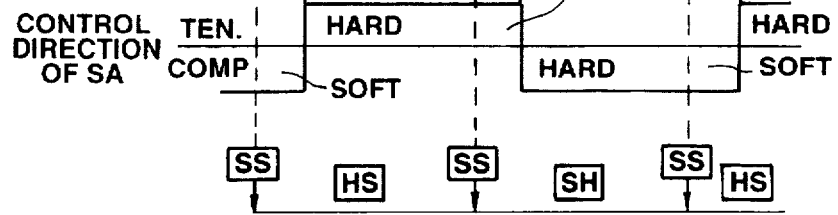
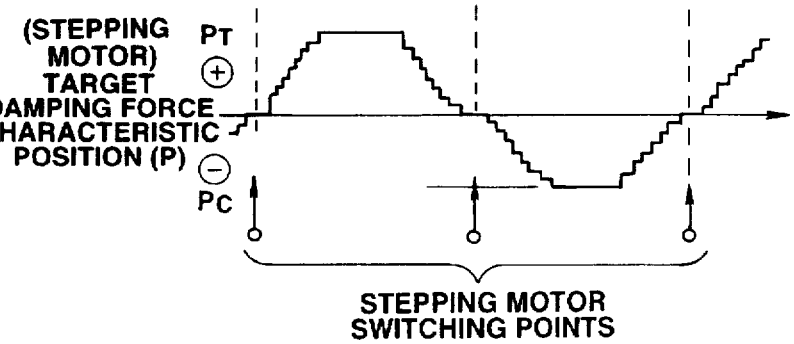

FIG.21F (FRONT) T.D.F.C.P.

FIG.21G (REAR) T.D.F.C.P.

APPARATUS AND METHOD FOR CONTROLLING DAMPING FORCE CHARACTERISTIC OF SHOCK ABSORBER FOR CAB OVER TYPE TRUCK

BACKGROUND OF THE INVENTION

The present invention relates to apparatus and method for controlling damping force characteristics of shock absorbers applicable to a cab over type truck.

A Japanese Utility Model Registration Application (unexamined) Publication No. Heisei 6-78010 published on Nov. 1, 1994 exemplifies a previously proposed suspension control system for a cab over type truck.

The previously proposed suspension control system includes: damping force characteristic adjustable shock absorbers mounted on a cab part of the truck; a vehicle speed sensor arranged for detecting a vehicle speed; a pressure responsive sensor arranged for detecting a drain pressure in a power assisted steering pump (a pump arranged in the power assisted steering system); and a control unit arranged for controlling damping forces of the respective shock absorbers on the basis of the detected values of the sensors.

However, the control over the damping force characteristic of each shock absorber is not based on a cab (vertical) behavior and, therefore, an appropriate control for the behavior of the cab cannot be performed. Consequently, a vehicular steering stability and a vehicular comfortablity are worsened.

In a case where a large input having a large amplitude in the vicinity to a cab sprung mass resonant frequency occurs, en extension limit over or upward pressing of the cab suspension occurs.

SUMMARY OF THE INVENTION

It is an object of the present invention to provide apparatus and method for controlling a damping force characteristic of at least one shock absorber for a cab over type truck which can make an appropriate control over a behavior of a cab part of the truck so that a vehicular steering stability and a comfortability can be secured and which can prevent an extension limit over and/or upward pressing of the shock absorber due to an occurrence of an input from a road having a large amplitude from occurring.

According to one aspect of the present invention, there is provided with an apparatus for a cab over type truck, comprising:

a) at least one shock absorber interposed between a vehicle cab of the truck and a vehicle chassis of the truck and having a damping force characteristic varying member arranged so as to enable a variation in the damping force characteristic of the shock absorber in response to a control signal;

b) a vertical behavior sensor arranged on the vehicle chassis of the truck for detecting a vertical behavior on the chassis; and c) a control unit arranged for estimating the vertical behavior on the cab of the truck from the detected vertical behavior on the chassis, and providing a control signal for the shock absorber so as to control the damping force characteristic of the shock absorber on the basis of the estimated vertical behavior on the cab of the truck.

According to another aspect of the present invention, there is provided with an apparatus for a cab over type truck, comprising:

a) a plurality of shock absorbers interposed between a vehicle cab of the truck and a vehicle chassis and each having a damping force characteristic varying member arranged so as to enable a variation in the damping force characteristic of the shock absorber in response to a control signal;

b) a plurality of vertical acceleration sensors, each arranged on the chassis of the truck for detecting a vertical acceleration on the chassis of the truck; and c) a control unit arranged for estimating respective vertical velocities on the chassis of the truck and respective relative velocities between the chassis of the truck and the cab of the truck from the detected vertical acceleration sensors and for providing the control signals for the respective shock absorbers so as to control the damping force characteristics of the respective shock absorbers on the basis of the estimated vertical velocities on the cab and the estimated relative velocities between the truck and the cab.

According to still another aspect of the present invention there is provided with a method for a cab over type truck having at least one shock absorber interposed between a vehicle cab and a vehicle chassis and having a damping force characteristic varying member so arranged as to enable a variation in a damping force characteristic of the shock absorber in response to a control signal, comprising the steps of:

a) detecting a vertical behavior on the chassis;

b) estimating the vertical behavior on the cab from the detected vertical behavior on the chassis; and c) providing the control signal for the shock absorber so as to control the damping force characteristic of the shock absorber on the basis of the estimated vertical behavior on the cab of the truck.

BRIEF DESCRIPTION OF THE DRAWINGS

FIG. 17A, 17B, 17C, 17D, and 17E are integrally a timing chart of each signal derived in the damping force characteristic controlling apparatus in the first preferred embodiment according to the present invention.

FIG. 21A, 21B, 21C, 21D, 21E, 21F, and 21G are integrally a timing chart of each signal derived in the second preferred embodiment of the damping force characteristic controlling apparatus shown in FIGS. 18A to 20.

BEST MODE FOR CARRYING OUT THE INVENTION

Reference will hereinafter be made to the drawings in order to facilitate a better understanding of the present invention.

(FIRST PREFERRED EMBODIMENT)

Figure 1:
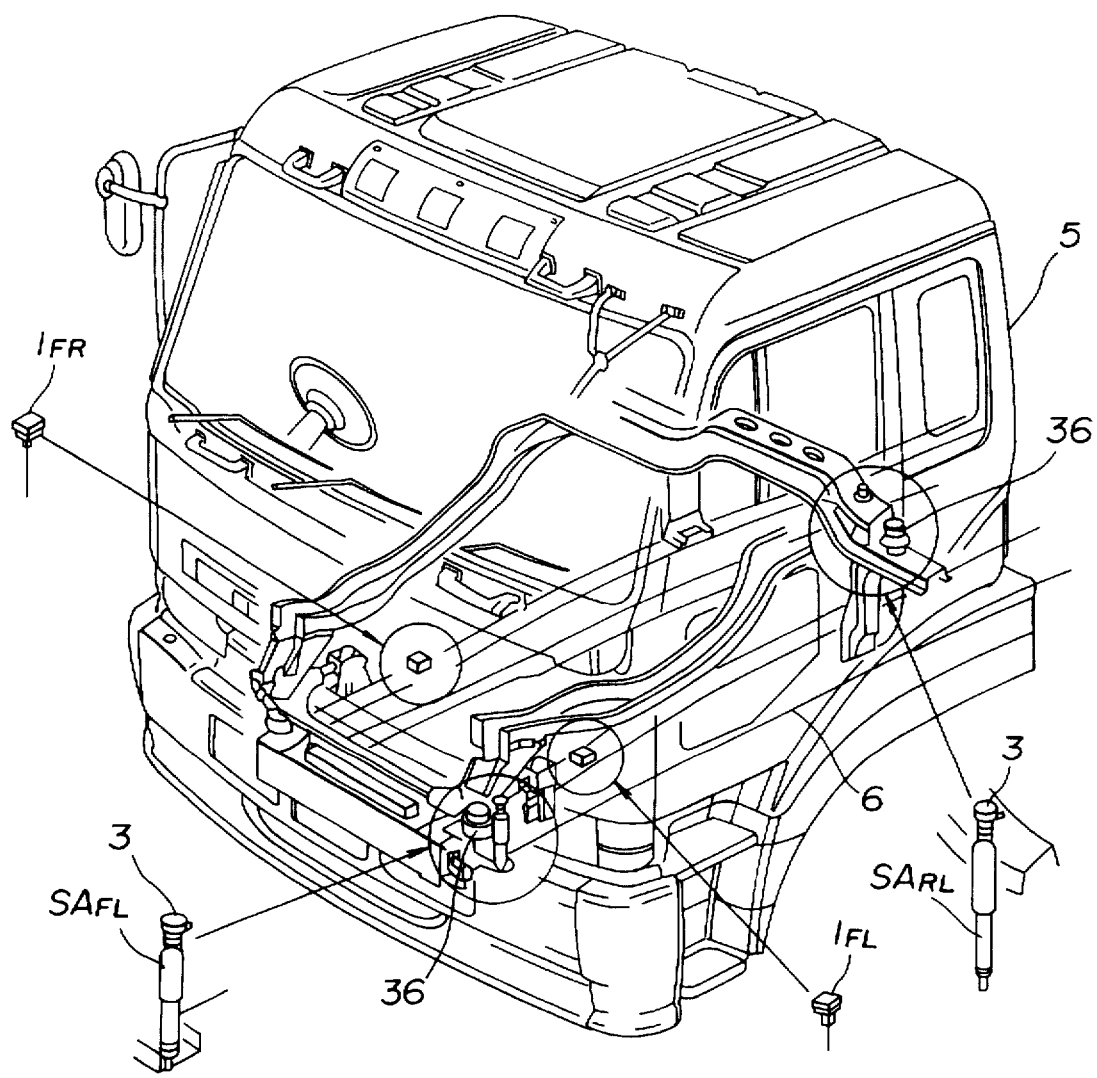
FIG. 1 is a schematic view of a first preferred embodiment of an apparatus for controlling a damping force characteristic of at least one shock absorber for a cab over type truck according to the present invention.

FIG. 1 shows an explanatory perspective view of a cab over type truck to which an apparatus for controlling a damping force characteristic of at least one shock absorber in a first preferred embodiment according to the present invention is applicable.

In FIG. 1, four shock absorbers, each shock absorber SA interposed between a cab 5 of the truck and a chassis 6 of the truck, namely, front left and right shock absorbers $SA_{FL}$ and $SA_{FR}$ and rear left and right shock absorbers $SA_{RL}$ and $SA_{RR}$ are mounted on a cab over type truck.

In addition, each aerial spring 36 is interposed between the cab 5 and chassis 6 at a position adjacent to a corresponding one of the front left and right and rear left and right shock absorbers $SA_{FL}$, $SA_{FR}$, $SA_{RL}$, and $SA_{RR}$.

It is noted that each shock absorber SA and each aerial spring 36 are disposed symmetrically with each other so that a right side portion thereof (a left side portion as viewed from FIG. 1) is omitted in FIG. 1 for convenience.

In addition, two front side vertical acceleration sensors $1_{FL}$ and $1_{FR}$ are mounted on the chassis 6 located at positions corresponding to the front left and right shock absorbers $SA_{FL}$ and $SA_{FR}$ for detecting a vertical acceleration G (a positive value in the case of an upward motion (behavior) and a negative value in the case of a downward motion (behavior)).

A control unit 4 is installed on the truck for outputting a drive command signal to a stepping motor 3 associated with each corresponding shock absorber SA on the basis of output signals from the respective vertical acceleration sensors $1_{FL}$ and $1_{FR}$.

Figure 2:
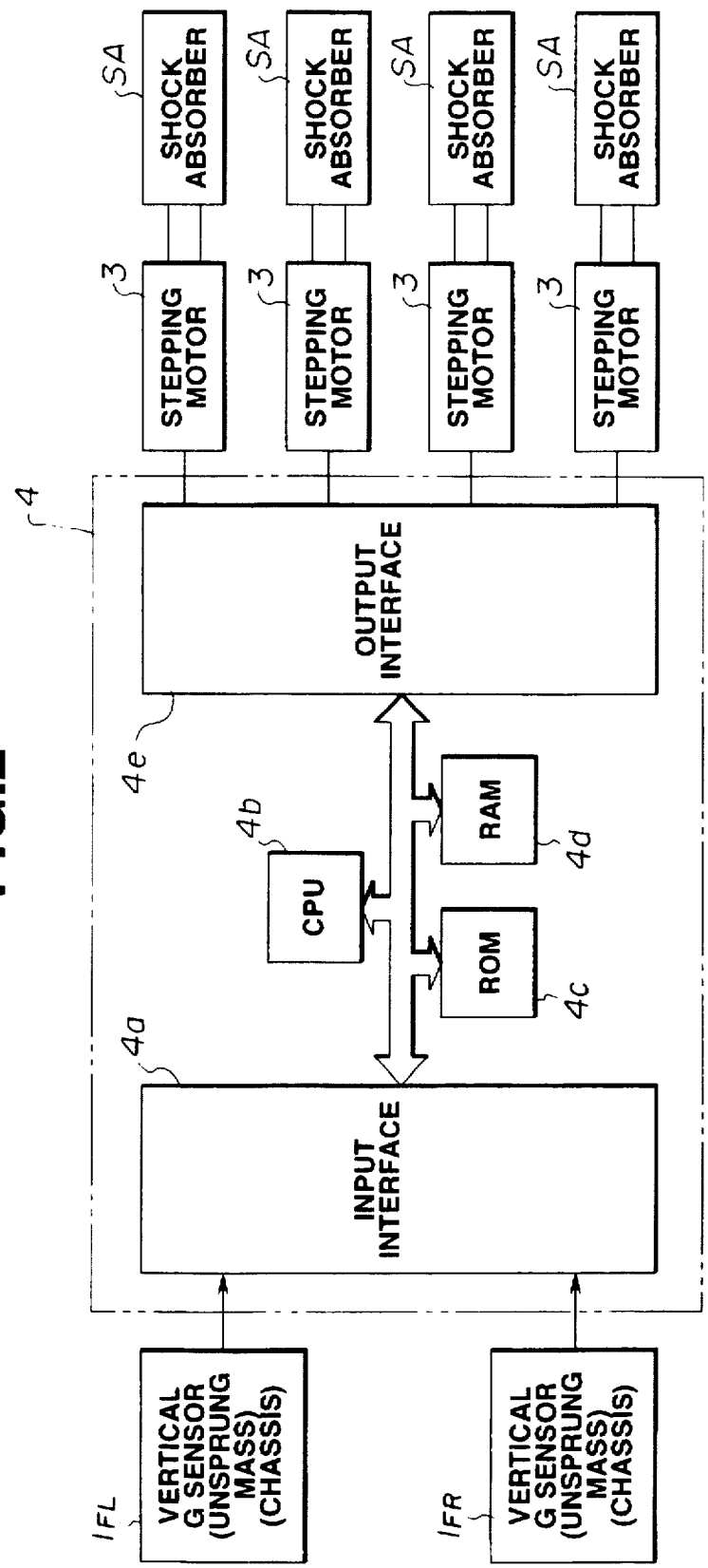
FIG. 2 is a circuit block diagram of the damping force characteristic controlling apparatus in the first embodiment shown in FIG. 1.

FIG. 2 shows a circuit block diagram of the damping force characteristic controlling apparatus in the first preferred embodiment according to the present invention.

The control unit 4 includes: an input interface 4a; a CPU 4b; a ROM 4c; a RAM 4d; an output interface 4e including a driver for each stepping motor 3, and a common bus.

Figure 13:
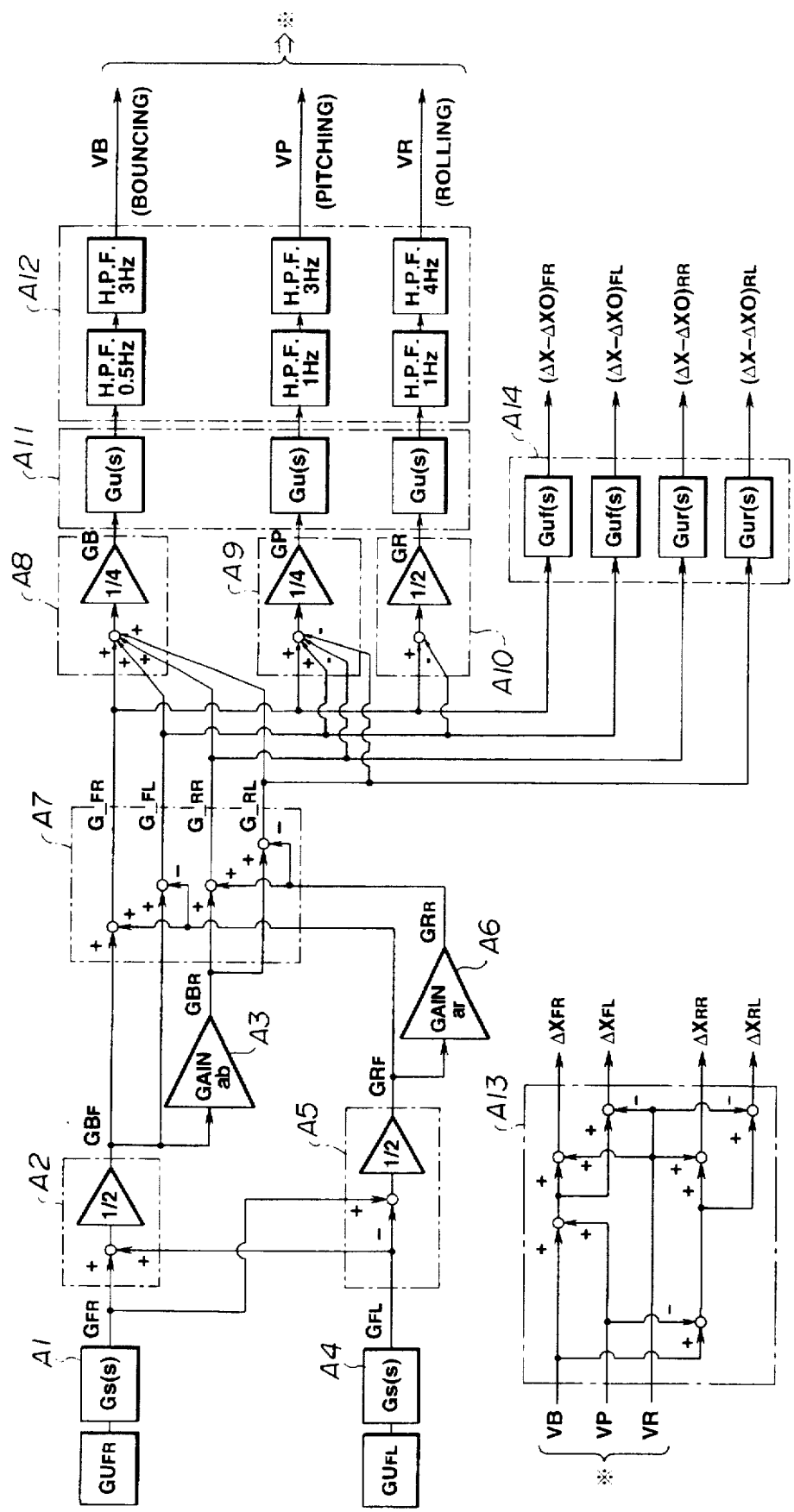
FIG. 13 is a circuit block diagram of a signal processing circuit executed in a control unit of the damping force characteristic controlling apparatus in the first embodiment shown in FIGS. 1 to 12.

The input interface 4a is provided with a signal processing circuit in terms of a firmware version which, as shown in FIG. 13, derives sprung mass vertical velocities ΔxFL, ΔxFR, ΔxRL, and ΔxRR at the front left and right and rear left and right positions of the cab 5 and relative velocities $(\Delta x-\Delta x0)_{FL}$, $(\Delta x-\Delta x0)_{FR}$, $(\Delta x-\Delta x0)_{RL}$, and $(\Delta x-\Delta x0)_{RR}$ between the cab 5 (sprung mass) and chassis 6 (unsprung mass) at the respective front left and right and rear left and right positions.

Figure 3:
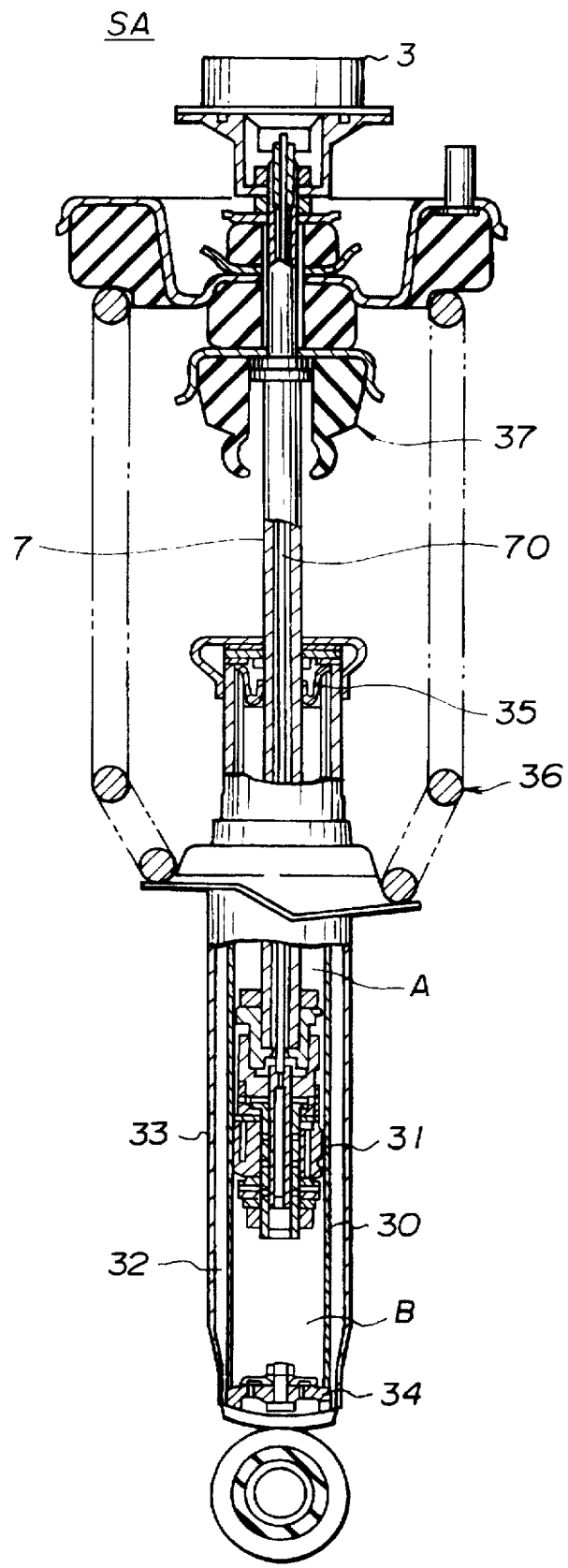
FIG. 3 is a vertically partially cross sectional view of the shock absorber applicable to the damping force characteristic controlling apparatus shown in FIGS. 1 and 2.

FIG. 3 shows a cross sectional view of the shock absorber SA used in the first embodiment of the damping force characteristic controlling apparatus according to the present invention.

The shock absorber SA includes a cylinder 30, a piston 31 for defining an upper chamber A and a lower chamber B, an outer envelope 33 forming a reservoir chamber 32 on an outer periphery of the cylinder 30, a base 34 defining a lower chamber B and reservoir chamber 32, a guide member 35 for guiding a slidable motion of the piston rod 7 linked to the piston 31, and a bumper rubber 37.

It is noted that the representative one of the four shock absorbers is denoted merely by SA.

Figure 4:
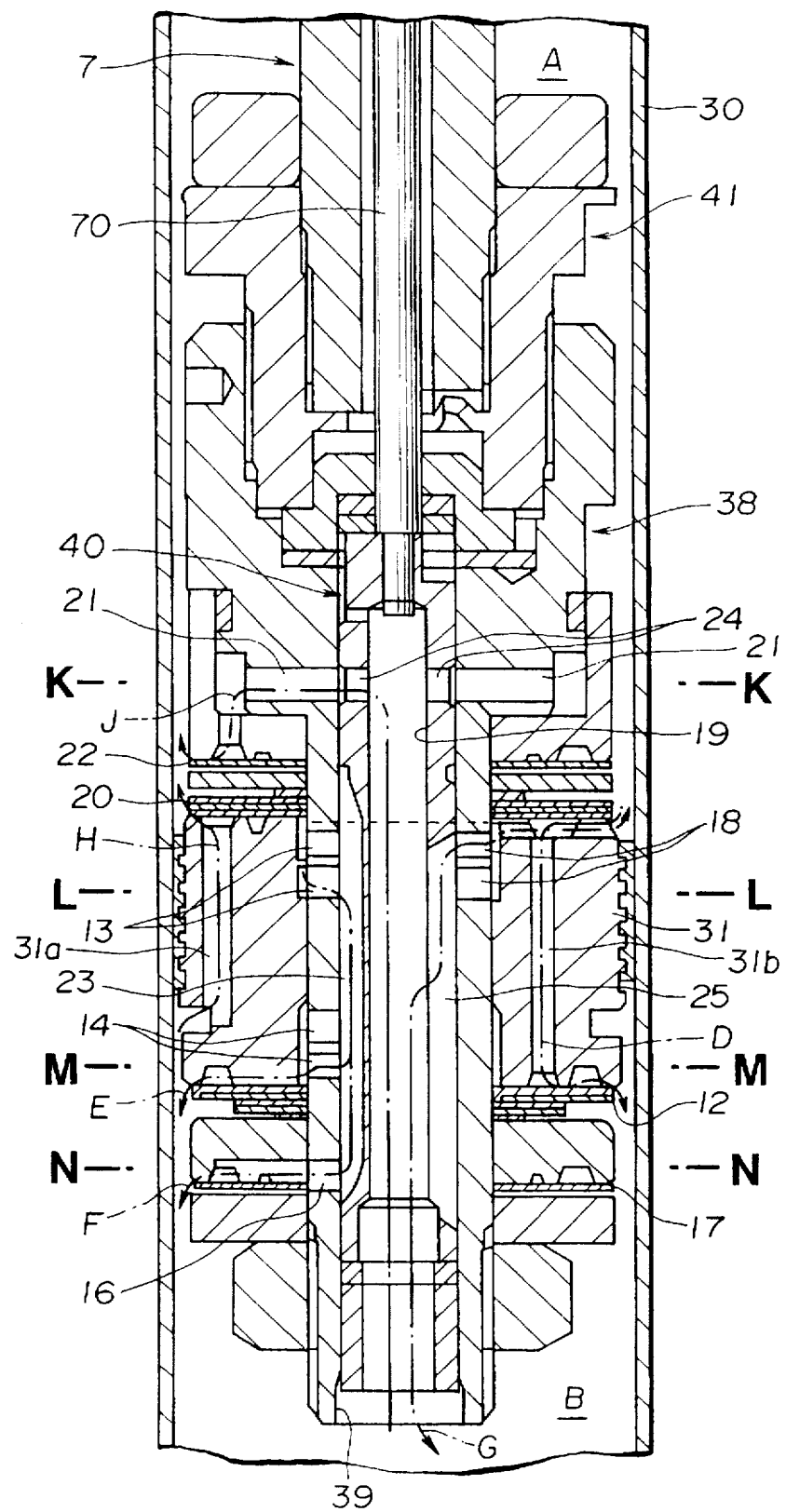
FIG. 4 is a vertically partially cross sectional view of an essential part of the shock absorber shown in FIGS. 1, 2, and 3.

FIG. 4 shows an enlarged cross sectional view representing a part of the piston assembly 31 and its surrounding part of each of the shock absorbers SA.

As shown in FIG. 4, the piston 31 is formed with penetrating holes 31a and 31b therethrough. In addition, the piston 31 is provided with a compression phase attenuation valve 20 and an extension phase attenuation valve 12, both of the valves 20, 12 respectively opening and closing the respective penetrating holes 31a and 31b. A stud 38 is spirally meshed with and fixed to a bound stopper 41 spirally meshed with and fixed to a tip end of a piston rod 7.

The stud 38 is penetrated through the piston 31. In addition, the stud 38 is formed with a communication hole 39 so as to communicate with the upper portion chamber A and the lower portion chamber B. In the communication hole 39 forming flow passage (an extension phase second flow passage E, extension phase third flow passage F, bypass flow passage G, and compression phase second passage as will be described later). Then, the adjuster 40 which changes flow passage cross sectional areas of the above-described flow passage is provided within the communication hole 39.

Furthermore, an extension phase side check valve 17 and a compression phase side check valve 22 are also installed on an outer periphery of the stud 38, which enable and disable the fluid flow through the above-described flow passages formed by the communication hole 39 in accordance with a direction of the flow of the fluid. As shown in FIG. 3, the adjuster 40 is rotatable by means of the corresponding one of the actuators (stepping motors) 3 via the control rod 70.

It is noted that the stud 38 is formed with a first part 21, a second port 13, a third port 18, a fourth port 14, and fifth port 16, respectively, in an upper order (sequence).

On the other hand, referring to FIG. 4, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and the lower portion chamber B as the fluid flow passages when the piston stroke indicates the extension phase: namely, 1) an extension phase first flow passage D such that the fluid passes the penetrating hole 31$b$, a valve opened internal side of the extension phase side attenuation valve 12, and reaches the lower portion chamber B; 2) an extension phase second flow passage E in which the fluid flows through the second port 13, the longitudinal groove 23, the fourth port 14, a valve opened outer peripheral side of the extension phase side attenuation valve 12, and reaches the lower portion chamber B; 3) an extension phase side third flow passage F in which the fluid passes through the third port 18, the second internal hole 25, and the hollow portion 19 and reaches the lower portion chamber B.

In addition, the three fluid flow passages through which the fluid can be caused to flow during the compression phase side of the piston 31 includes: 1) a compression phase (stroke side) first flow passage H in which the fluid flows through the penetrating hole 31$a$ and valve opened compression stroke side (phase) second flow passage J in which the hollow portion 19, the first lateral hole 24, the first port 21, and the opened compression phase (stroke side) check valve 22 and reaches the upper portion chamber A; and 3) the bypass passage G in which the fluid flows through the hollow portion 19, the second lateral hole 25, and the third port 18.

Figure 5:
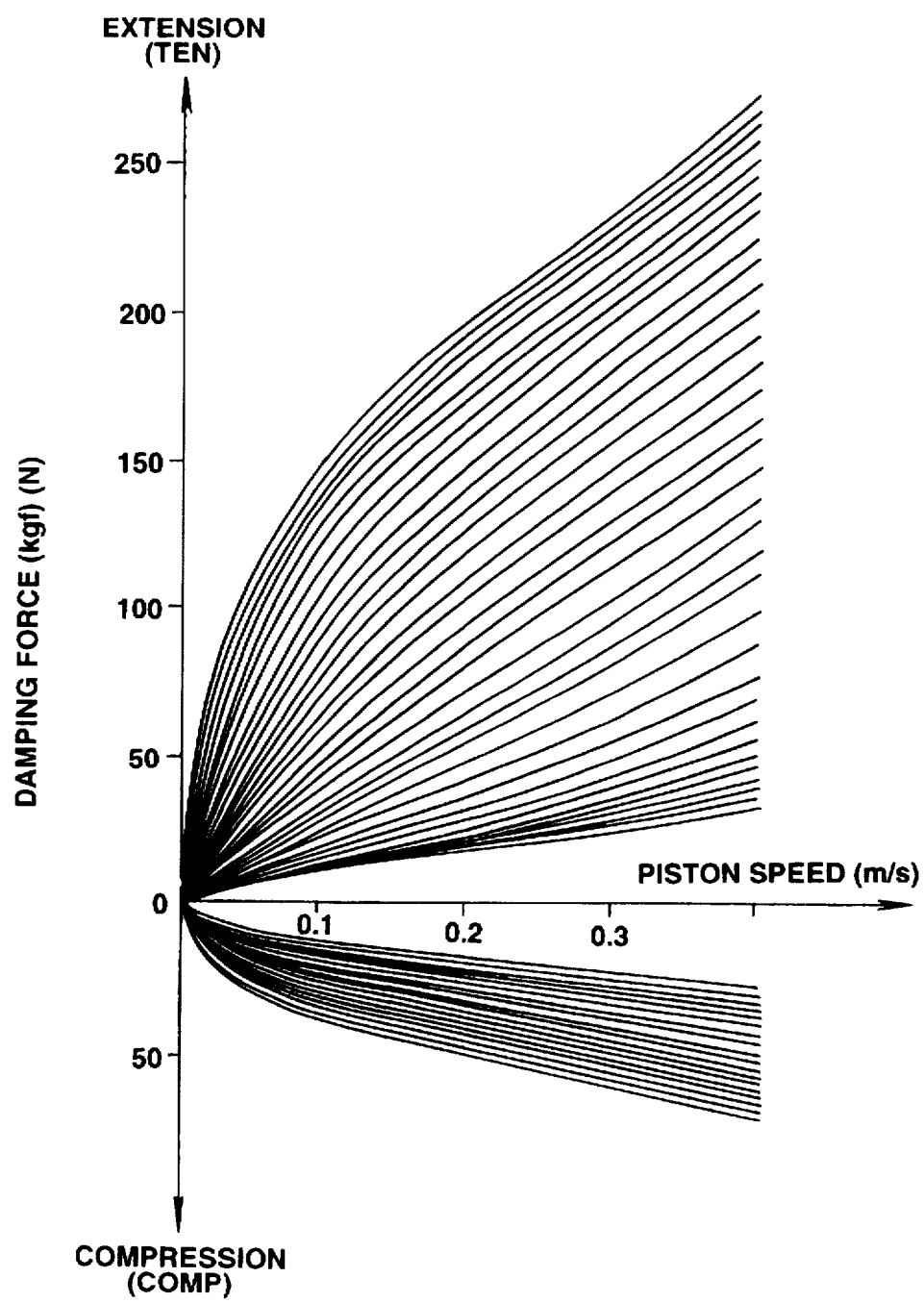
FIG. 5 is a characteristic graph of the damping force exerted by the shock absorber shown in FIGS. 1 to 4.

In summary, the shock absorber SA is so arranged and constructed as to be enabled to change the damping force characteristics at a multiple stage in its damping force characteristic, as shown in FIG. 5, either in the extension phase or compression phase when the adjuster 40 is pivoted according to the rotation of the corresponding one of the stepping motors 3.

Figure 6:
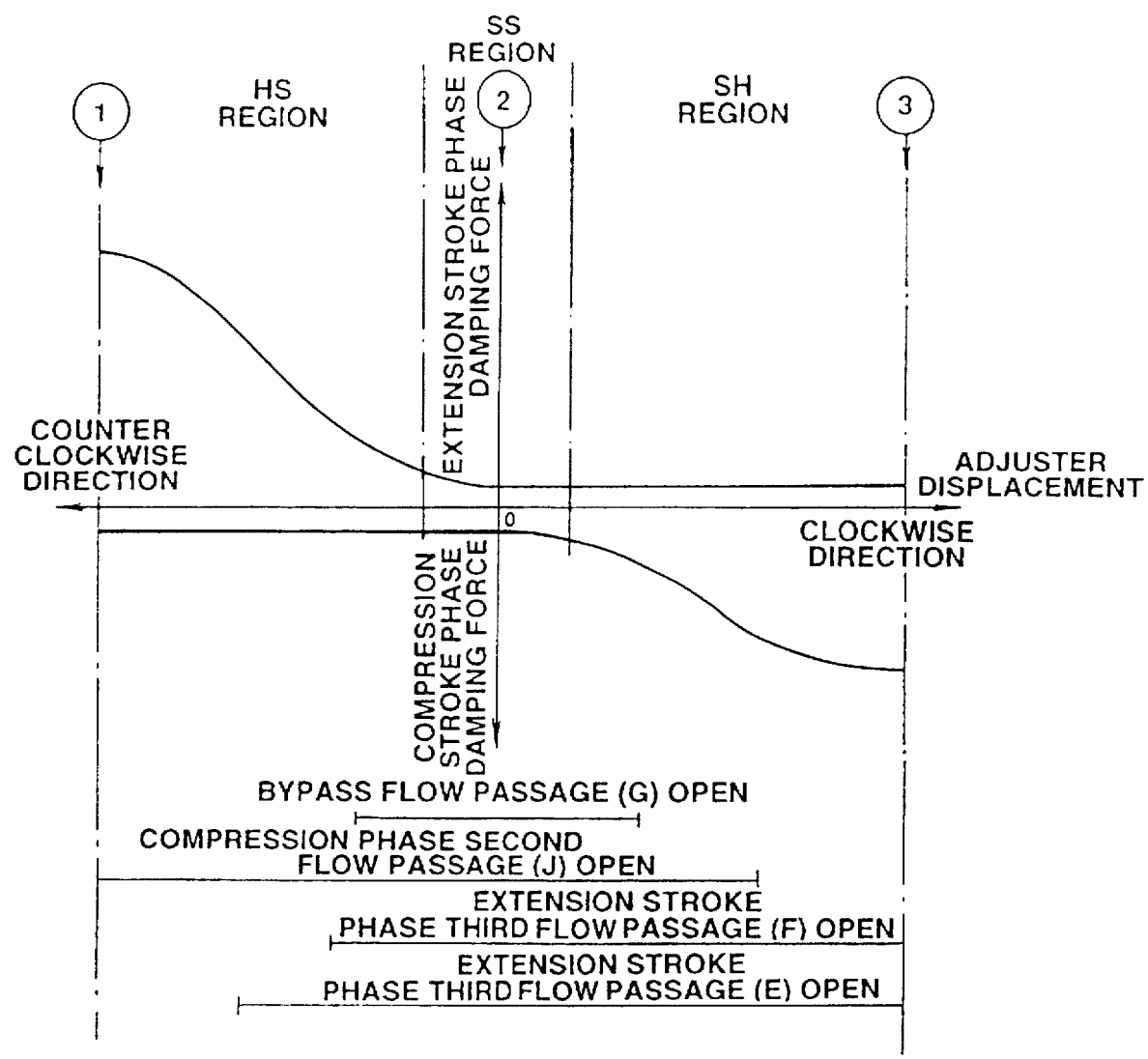
FIG. 6 is a characteristic graph of the damping force variable according to a rotation position of an adjuster disposed within the shock absorber shown in FIGS. 1 to 5.
Figure 7A:
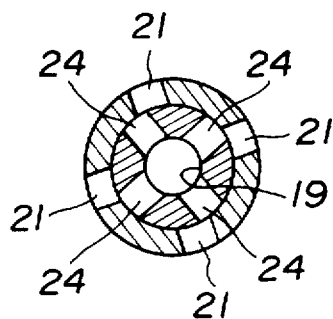
FIGS. 7A through 7C are horizontally cross sectional views of the shock absorber cut way along a line of K—K of FIG. 4.
Figure 7B:
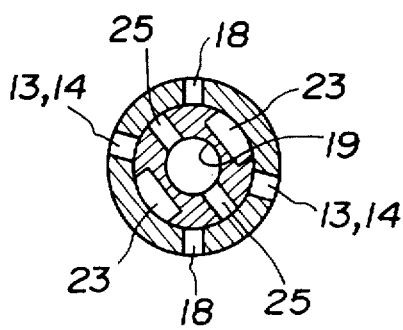
Figure 7C:
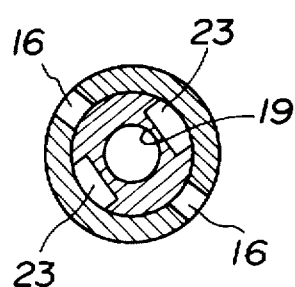
Figure 8A:
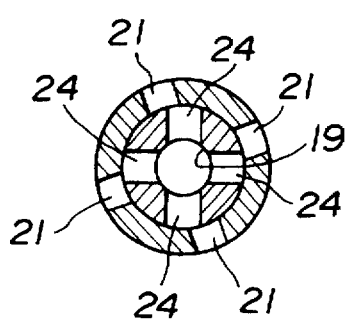
FIGS. 8A through 8C are horizontally cross sectional views of the shock absorber cut way along a line of L—L of FIG. 4 and along a line of M—M of FIG. 4.
Figure 8B:
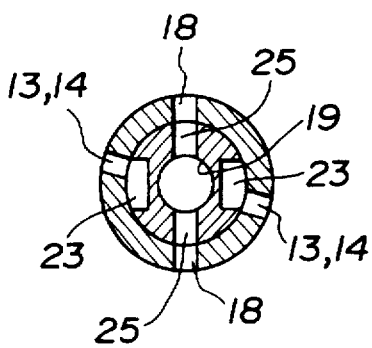
Figure 8C:
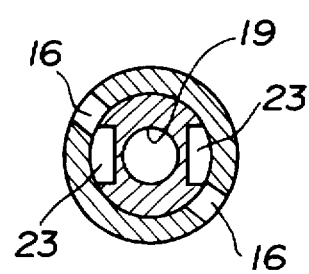
Figure 9A:
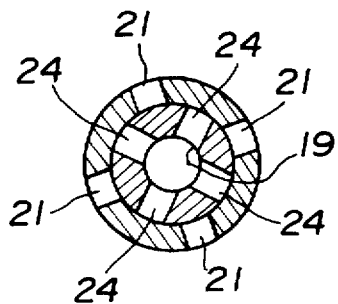
FIGS. 9A through 9C are horizontally cross sectional views of the shock absorber cut away along a line of N—N of FIG. 4.
Figure 9B:
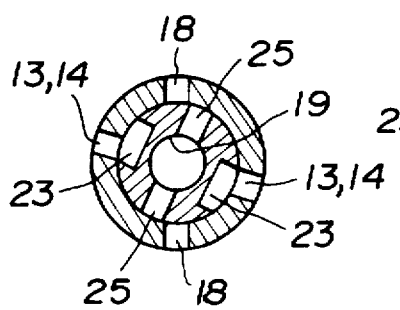
Figure 9C:
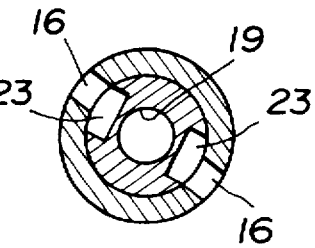

FIG. 6 shows relationships between the rotated position of the adjuster 40 and damping force characteristics at both of the extension phase and compression phase with respect to the piston 31.

In details, as shown in FIG. 6, when the adjuster 40 is pivoted in a given counterclockwise direction from a generally center position at which both of the extension and compression phases are in soft damping force characteristic positions (also, referred to as a soft region (soft control mode) SS), the damping force coefficient at the extension phase can be changed at the multiple stage from a maximum hard to a minimum hard characteristic but the compression stroke side is fixed at a soft position (also, referred to as an extension stroke side (phase) hard region HS). On the contrary, when the adjuster 40 is pivoted in a given clockwise direction therefrom, the damping force characteristic at the multiple stages and the damping force characteristic in the compression stroke side is fixed to the soft position (also, referred to as a compression hard region (compression phase hard) SH).

When, as shown in FIG. 6, the adjuster 40 is pivoted at any one of positions ①, ②, and ③, cross sections of the piston assembly portions cut away along lines K—K, L—L, M—M, and N—N of FIG. 4 are respectively shown in FIGS.

7A (①), 7B (②), and 7C (③) (K—K), 8A (①), 8B (②), and 8C (③) (L—L, M—M), 9A (①), 9B (②), and 9C (③) (N—N), respectively.

Figure 10:
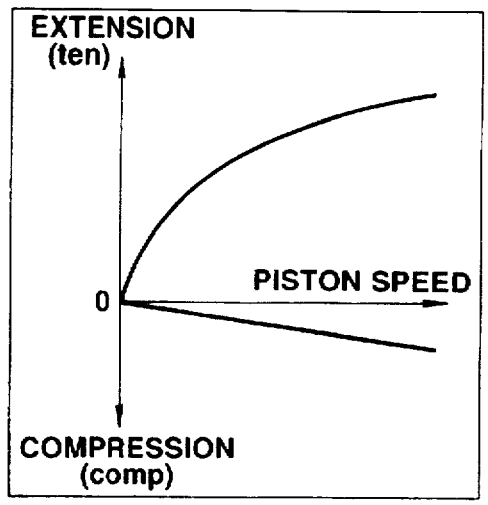
FIG. 10, FIG. 11, and FIG. 12 are characteristic graphs when the shock absorber falls in an extension hard and compression soft region (HS), when the shock absorber falls in an extension and compression soft region (SS), and when the shock absorber falls in a compression hard and extension soft region (SH), respectively.
Figure 11:
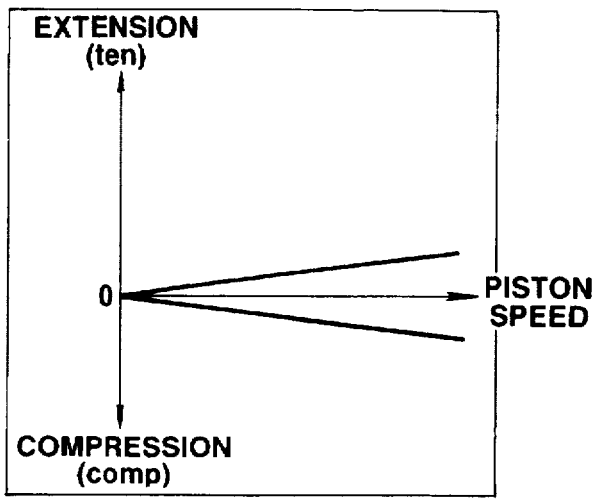
Figure 12:
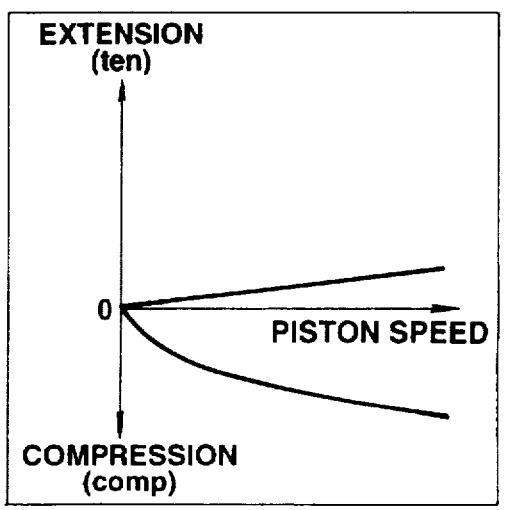

The damping force characteristics at the respective portions ①, ②, and ③ shown in FIG. 6 are shown in FIGS. 10, 11, and 12, respectively.

FIG. 10 shows the damping force characteristic of the representative shock absorber SA when the adjuster 40 is positioned at ① of FIG. 6.

FIG. 11 shows that when the adjuster 40 is positioned at ② of FIG. 6.

FIG. 12 shows that when the adjuster 40 is positioned at ③ of FIG. 6.

Figure 14:
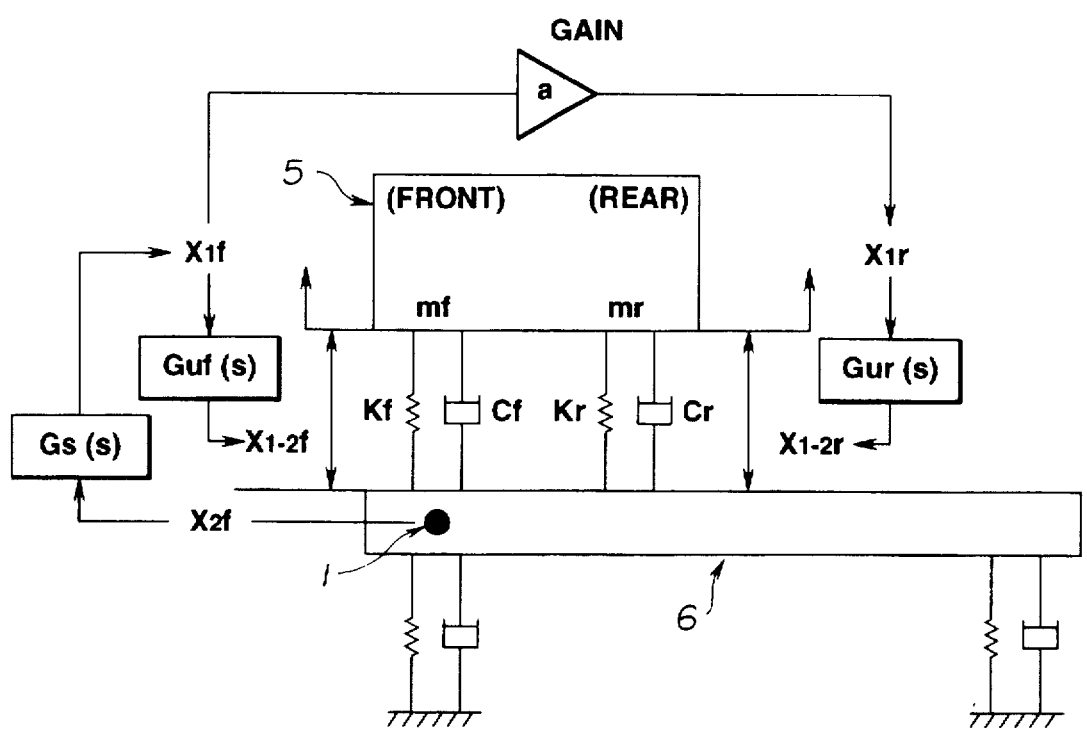
FIG. 14 is a model view of a general concept of the signal processing executed in the control unit of the damping force characteristic controlling apparatus in the first embodiment shown in FIGS. 1 to 13.

Next, FIGS. 13 and 14 show a structure of the signal processing circuit and a general concept of signal processing to derive the sprung mass vertical velocities ΔxFL, ΔxFR, ΔxRL, and ΔxRR at the front left and right positions of the cab 5 and the relative velocities (Δ x-Δx0)FL, (Δx −Δx0)FR, (Δx −Δx0)RL, and (Δx −Δx0)RR between the sprung mass (cab 5) and the unsprung mass (chassis 6) at the corresponding front left and right and rear left and right positions from the unsprung mass vertical acceleration signals GUFL and GUFR at the front left and right positions of the chassis 6 as the content of the control over the damping force characteristics of the respective shock absorbers SA (SA$_{FL}$, SA$_{FR}$, SA$_{RL}$, and SA$_{RR}$) in the first preferred embodiment of the damping force characteristic controlling apparatus according to the present invention.

At blocks A1 and A4, the CPU 4$b$ derives sprung mass vertical accelerations G$_{FL}$ and G$_{FR}$ on the cab 5 at front left and right shock absorbers SA$_{FL}$ and SA$_{FR}$ on the basis of a transfer function GS(S) from an unsprung mass acceleration x2f up to a sprung mass vertical acceleration x1f shown in the following equation (1): G$_s$(S)=(cf.s+kf)/(mf.s$^2$+cf.s+kf) - - - (1), wherein mf denotes the front side sprung mass (cab 5), mr denotes the rear side sprung mass, cf denotes an attenuation coefficient at the front side suspension, cr denotes an attenuation coefficient at the rear side suspension, kf denotes the spring constant at the front side suspension and kr denotes the spring constant at the rear side suspension. In addition, suppose that the front side unsprung mass vertical acceleration x2f, the rear side unsprung mass acceleration x2r, the front side sprung mass vertical acceleration x1f, the rear side sprung mass vertical acceleration x1r, the front side unsprung mass vertical velocity Δx1f, and the rear side sprung mass vertical velocity Δx1r. Then, the following equation (2) is established and the above-described equation (1) can be derived. m.x$_1$=−k(x$_1$−x$_2$)−c(Δx$_1$−Δx$_2$) - - - (2). At the subsequent block A2, the CPU 4$b$ derives the bouncing rate GBF at a center position of the cab 5 between the front left and right shock absorbers GBF on the basis of the following equation (3) from the sprung mass vertical accelerations G$_{FL}$ and G$_{FR}$ at the front left and right shock absorbers SA$_{FL}$ and SA$_{FR}$ derived at the blocks A1 and A4.

$$G_{BF}=(G_{FL}+G_{FR})/2 \qquad (3).$$

At the subsequent block A3, the CPU 4$b$ derives the bouncing rate G$_{BR}$ at a center position of the cab 5 between the rear left and right shock absorbers SA$_{RL}$ and SA$_{RR}$ from the bouncing rate GBF at the center position of the cab 5 between the front left and right shock absorbers SAFL and SAFR by means of a predetermined gain α b.

On the other hand, at the subsequent block A5, the CPU 4$b$ derives a front side rolling rate G$_{RF}$ on the cab 5 on the basis of the following equation (4) from the sprung mass vertical accelerations G$_{FL}$ and G$_{FR}$ on the cab 5 at the front left and right shock absorbers $SA_{FL}$ and $SA_{FR}$ derived at the blocks A1 and A4.

$$G_{RF} = (G_{FR} - G_{FL})/2 \quad (4)$$

At the subsequent block A6, the CPU 4b derives the rolling rate GRR on the cab 5 at the positions at which the rear left and right shock absorbers SARL and SARR are mounted from the front side rolling rate GRF on the cab 5 by means of a predetermined gain α r.

At the subsequent block A7, the CPU 4b derives the sprung mass vertical acceleration signals $G_{-FR}$, $G_{-FL}$, $G_{-RL}$, $G_{RR}$ on the cab 5 at positions at which the front left and right and rear left and right shock absorbers $SA_{FL}$, $SA_{FR}$, $SA_{RL}$, and $SA_{RR}$ are mounted on the basis of the following equations (5) through (8).

$$G_{-FR} = G_{BF} + G_{BF} \quad (5)$$

$$G_{-FL} = G_{BF} - G_{RF} \quad (6)$$

$$G_{-RR} = G_{BR} + G_{RR} \quad (7)$$

$$G_{-RL} = G_{BR} - G_{RR} \quad (8)$$

At the subsequent blocks A8, A9, and A10, the CPU 4b derives the bouncing component $G_B$, the pitching component $G_P$, and the rolling component $G_R$, and the rolling component $G_R$ of the acceleration on the cab 5 on the basis of the following equations (9) through (11).

$$G_B = (G_{-FR} + G_{-FL} + G_{-RR} + G_{-RL})/4 \quad (9)$$

$$G_P = \{(G_{-FR} + G_{-FL}) - (G_{-RL} + G_{-RR})\}/4 \quad (10)$$

$$G_R = (G_{-FR} - G_{-FL})/2 \quad (11)$$

At the subsequent block A11, the CPU 4b converts the bouncing component $G_B$, the pitching component $G_P$, and the rolling component $G_R$ of the sprung mass vertical acceleration on the cab 5 using a phase delay compensation.

It is noted that a general formula on a phase delay compensation can be represented by the following transfer function.

$$G_{(s)} = (As+1)/(Bs+1) \quad (12), (A<B)$$

In addition, as a phase lag compensation formula having the same phase and gain characteristics as those in a case where the integration of (1/s) in a frequency region of 0.5 Hz to 3 Hz required for the damping force characteristic control and to reduce the gain at the low frequency side (~0.05 Hz), the following transfer equation (6) is used:

$$G_{(s)} = (0.001s+1)/(10s+1) \times \gamma \quad (13)$$

In the equations (5) and (6), γ denotes the gain used to match the gain characteristic to that of the signal derived from the integration (1/s) and s denotes a complex variable and the equations (5) and (6) denote the Laplace transformation equations.

Figure 15A:
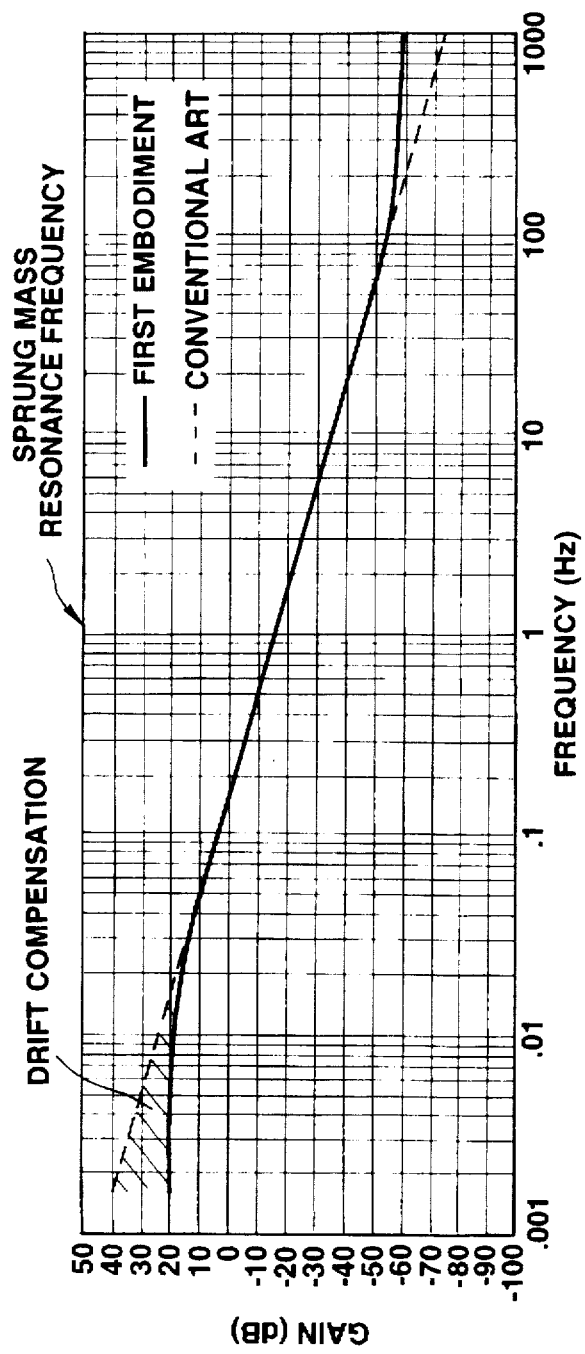
FIGS. 15A and 15B are gain characteristic and phase characteristic of a representative sprung mass vertical velocity signal derived in the signal processing circuit of the damping force characteristic controlling apparatus in first preferred embodiment according to the present invention.
Figure 15B:
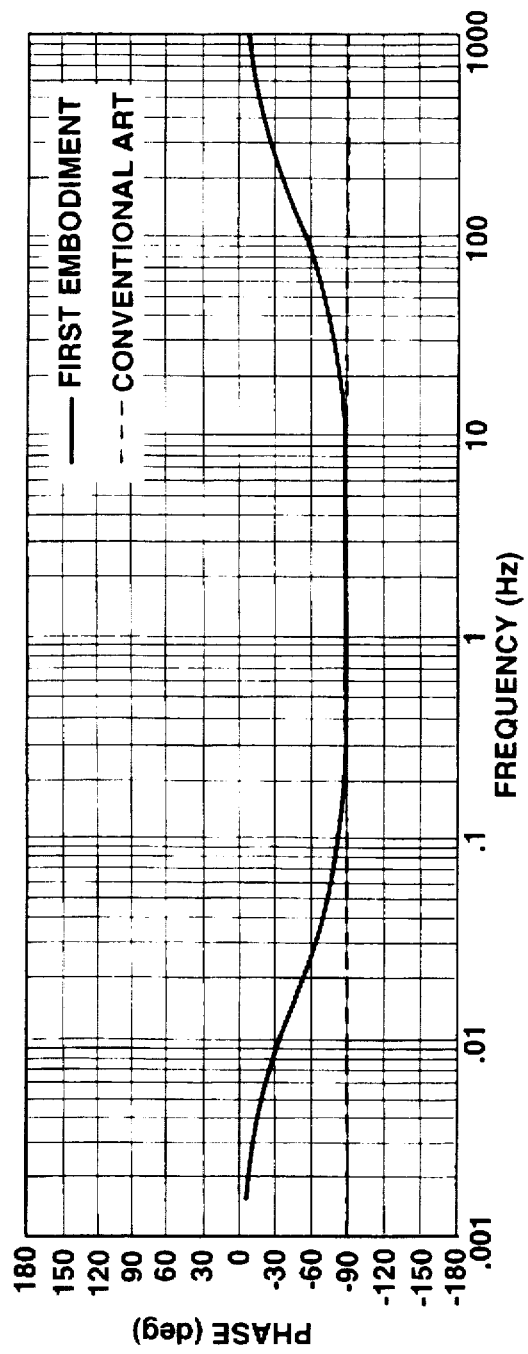

In the first preferred embodiment, γ=10 is set. Consequently, as the gain characteristic denoted by a solid line in FIG. 15A is shown and as the phase characteristic denoted by the solid line of FIG. 15B is shown, the gain at the low frequency side is only reduced without worsening of the gain characteristic at the frequency band (0.5 Hz to 3 Hz) required for the damping force characteristic control. It is noted that dotted lines of FIGS. 15A and 15B are the gain and phase characteristics when the integration for the vertical sprung mass acceleration is executed with respect to (1/s).

At the next block A12, the CPU 4b executes the band pass filtering processing BPF used to enhance an isolation characteristic for the signals except a target frequency band to be executed for control. Thus, a sprung mass vertical velocity related bouncing component $V_B$, a sprung mass vertical velocity related pitching component $V_P$, a sprung mass vertical velocity related rolling component $V_R$ are derived.

At the subsequent step A13, sprung mass vertical velocity signals ΔxFL, ΔxFR, ΔxRL, and ΔxRR at the positions of the respective shock absorbers $SA_{FR}$, $SA_{FL}$, $SA_{RL}$, and $SA_{RR}$ on the basis of the following equations (14) through (17).

$$\Delta xFL = V_B + V_P - V_R \quad (14)$$

$$\Delta xFR = V_B + V_P + V_R \quad (15)$$

$$\Delta xRL = V_B - V_P - V_R \quad (16)$$

$$\Delta xRR = V_B - V_P + V_R \quad (17)$$

Referring to FIG. 13, at a block A14, the CPU 4b derives relative velocities (Δx −Δx0) between the sprung mass (cab 5) and unsprung mass (chassis 6) at the front left and right and rear left and right shock absorbers $SA_{FL}$ and $SA_{FR}$ and SARL and SARR as denoted by (Δx−Δx0)FL, (Δx−Δx0)FR, (Δx−Δx0)RL, and (Δx−Δx0)RR.

$$Guf(S) = -mf.s/(cf.s+kf) \quad (18)$$

$$Gur(S) = -mr.s/(cf.s+kr) \quad (19)$$

The above equations (18) and (19) can be derived from the equation (2).

Figure 16:
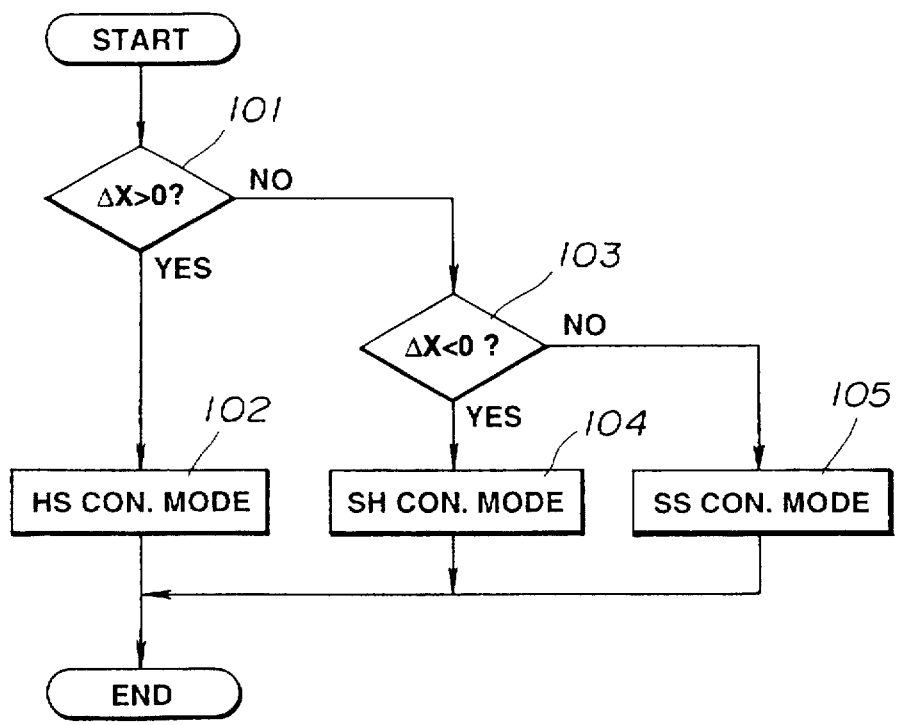
FIG. 16 is an operational flowchart executed in the control unit of the damping force characteristic controlling apparatus in the first embodiment shown in FIGS. 1 to 15B.

Next, FIG. 16 shows a basic control operation on the damping force characteristic of each shock absorber SA in the control unit 4. The basic control operation is carried out for each shock absorber $SA_{FL}$, $SA_{FR}$, $SA_{RL}$, and $SA_{RR}$.

That is to say, a target damping force characteristic position P ($P_T$, $P_C$) for each shock absorber SA is calculated by the CPU 4b on the basis of the operational flowchart shown in FIG. 16.

At a step 101 of the flowchart in FIG. 16, the CPU 4b determines whether the sprung mass vertical velocity signal Δx indicates positive.

The routine goes to a step 102 in which the CPU 4b is operated to control each shock absorber SA to the extension stroke side hard region HS if the CPU determines that Δx>0. If the CPU 4b determines that Δx≦0 at the step 103, the routine goes to a step 103 in which the CPU 4b determines whether Δx<0.

If Yes at the step 103, the routine goes to a step 104 in which the CPU 4b controls each shock absorber SA to the compression phase hard region SH.

If No at the step 103 (Δx=0), the routine goes to a step 105 in which the CPU 4b controls each shock absorber SA to both of the compression and extension phases in SS mode (soft and soft).

That is to say, if the signal Δx is varied as shown in timing charts shown in FIGS. 17A, 17B, 17C, 17D, and 17E, the shock absorbers SA are controlled in the soft region SS when the signal value Δx is zeroed.

In addition, when the signal Δx indicates positive, the extension phase hard region HS is controlled so that the damping force characteristic at the compression phase is fixed to the soft characteristic and the damping force characteristic at the extension phase constituting the control signal (target damping force characteristic position $P_T$) is varied in proportion to the signal Δx based on the following equation (20).

$$P_T = \alpha \cdot \Delta x \cdot Ku \qquad (20)$$

In the equation (20), $\alpha$ denotes a constant at the extension phase side and Ku denotes a gain variably set according to the present relative velocity $(\Delta x - \Delta x0)$ between the sprung mass and unsprung mass.

In addition, if the value of the control signal V indicates negative, the control is returned to the compression phase hard region SH to modify the compression phase damping force characteristic (target damping force characteristic PC) in proportion to the signal $\Delta x$ on the basis of the following equation (21).

$$P_C = \beta \cdot \Delta x \cdot Ku \qquad (21)$$

In the equation (21), $\beta$ denotes a constant at the compression phase.

Next, FIGS. 17A through 17E integrally show a timing chart for explaining a switching operation state in a controllable region of the shock absorber SA in the damping force characteristic control operation of the control unit 4.

As shown in timing charts of FIG. 17A through 17E, the region a denotes a state wherein the control signal V based on the sprung mass vertical velocity is reversed from a negative value (upward) to a positive value (downward). At this time, since the relative velocity between the sprung mass and the unsprung mass indicates the negative region (the compression phase side toward which the shock absorber SA strokes) on the basis of the direction of the signal $\Delta x$, the compression stroke side which is the stroke of the shock absorber SA indicates the soft characteristic.

In addition, the region b indicates the region switched from the negative value to the positive value (extension stroke side toward which the shock absorber SA strokes) on the relative velocity between the sprung mass and the unsprung mass with the signal $\Delta x$ being left to indicate the positive value(upward). At this time, the shock absorber SA is controlled at the extension phase hard region SH on the basis of the direction of the signal $\Delta x$. In addition, since the stroking phase of the shock absorber SA is also in the extension phase, hence, the extension stroking phase of the shock absorber SA indicates the hard characteristic in proportion to the value of the signal $\Delta x$.

In addition, the region c is a state wherein the signal $\Delta x$ is reversed from the positive value (upward) to the negative value (downward). At this time, since the relative velocity between the sprung mass and unsprung mass indicates positive (extension phase side of the stroke of the shock absorber SA), the shock absorber SA is controlled to the compression phase hard region SH on the basis of the direction of the signal $\Delta x$. Hence, at the region thereof, the compression phase side of the shock absorber SA indicates the hard characteristic in proportion to the value of the signal $\Delta x$.

As described above, in the first embodiment according to the present invention, when the sign of the signal $\Delta x$ and the sign of the relative velocity between the sprung mass and the unsprung mass are the same signs (region b and the region d), the stroking side of the shock absorber SA is controlled to the hard characteristic. When the signs described above are different (the region a and the region c) from each other, the instantaneous shock absorber SA falls in the soft characteristic. The same control as the damping force characteristic based on the Skyhook (control) theorem is carried out only by means of the signal $\Delta x$.

In addition, when the stroking position of the shock absorber SA is switched, namely, the control is transferred from the region a to the region b, namely, from the region c to the region d (from the soft characteristic to the hard characteristic), the damping force characteristic position at the switching stroke side is already carried out at the regions a and c so that the switching from the soft characteristic to the hard characteristic is carried out without delay in time. Consequently, the high control responsive characteristic is achieved and the switching between the hard characteristic to the soft characteristic is carried out without the drive of the corresponding one of the stepping motors 3. Thus, the durability of each stepping motor 3 and the saving of the consumed power can be improved.

Next, a signal drift preventive action will be explained by means of an extra low frequency input.

When the vehicle is braked, a truck body (also, called a vehicle body) is inclined due to a, so-called, dive phenomenon of the truck body such that a front part of the truck body is tended to be sunk and a rear part of the truck is tended to float and, in this inclined state, a truck body speed is decelerated so that a resultant force of the deceleration is detected by means of the vertical G sensor 1 as a downward sprung mass acceleration component. This continuously input low frequency downward sprung mass acceleration component causes a signal drift.

The above-described cause of the signal drift is found in a case wherein an abrupt acceleration of the truck (of the vehicle) such as a cause of a squat phenomenon, wherein the truck is running on a long ascending slope (in this case, an upward sprung mass vertical acceleration component is detected), wherein the acceleration running is carried out on a long descending slope, or wherein an almost DC component is inputted into the signal derived by the vertical G sensor 1.

However, in the first embodiment according to the present invention, each sprung mass vertical acceleration G detected by means of each vertical G sensor 1 undergoes the phase delay compensation equation as the speed converting means which converts it into the sprung mass vertical velocity signal at each shock absorber mounted position so that only the gain at the lower frequency side is reduced without worsening of the phase characteristic at the frequency bands required to control the damping force characteristic.

Hence, even if a lower frequency component is extra added to the signal of each vertical G sensor 1 when the braking occurs, the reduction in the lower frequency side gain causes no influence on the damping force characteristic control.

As described hereinabove, the damping force characteristic controlling apparatus for the cab over type truck in the first preferred embodiment according to the present invention has the following advantages:

① Since the behavior of the cab 5 can appropriately be controlled, the vehicular steering stability can be increased and the vehicular comfortability can be assured.

② Since the signals derived from the two vertical G sensors $1_{FL}$ and $1_{FR}$ mounted on the chassis 6 at the positions at which the front left and right shock absorbers $1_{FL}$ and $1_{FR}$ are mounted are used to derive the sprung mass vertical velocity signals $\Delta x$ and the relative velocity signals $(\Delta x - \Delta x0)$ between the sprung mass and the unsprung mass at the four (front left and right and rear left and right) respective positions on the cab 5, the number of the sensors can be reduced and the total system cost can be reduced.

③ Since the phase delay compensation equation is used to convert the sprung mass vertical acceleration into the vertical velocity signal $\Delta x$, the signal drift due to the extra low frequency component input such as during the braking operation in the vehicle can be prevented. Thus, the controllability of the damping force characteristic in the shock absorber SA can be prevented. The vehicular steering stability and the vehicular comfortability can be improved.

④ In the damping force characteristic control based on the Skyhook control theorem, the switching from the soft damping force characteristic to the hard damping force characteristic can be carried out without the time delay. Thus, a high control responsive characteristic can be achieved. The switching from the hard damping force characteristic to the soft damping force characteristic can be carried out without drive of the actuator (stepping motor). Consequently, the durability of each stepping motor 3 can be improved and the saving of the consumed power can be achieved.

(SECOND EMBODIMENT)

Next, the damping force characteristic controlling apparatus in a second preferred embodiment according to the present invention will be described below.

In the second embodiment, a corrective control portion which carries out a prevention of an extension limit over and upward pressing of each shock absorber is provided in addition to the basic control portion of the damping force characteristic controlling apparatus. Since the structure of the damping force characteristic controlling apparatus in the second embodiment is generally the same as that in the first embodiment, the difference point will only be described below.

Figure 18A:
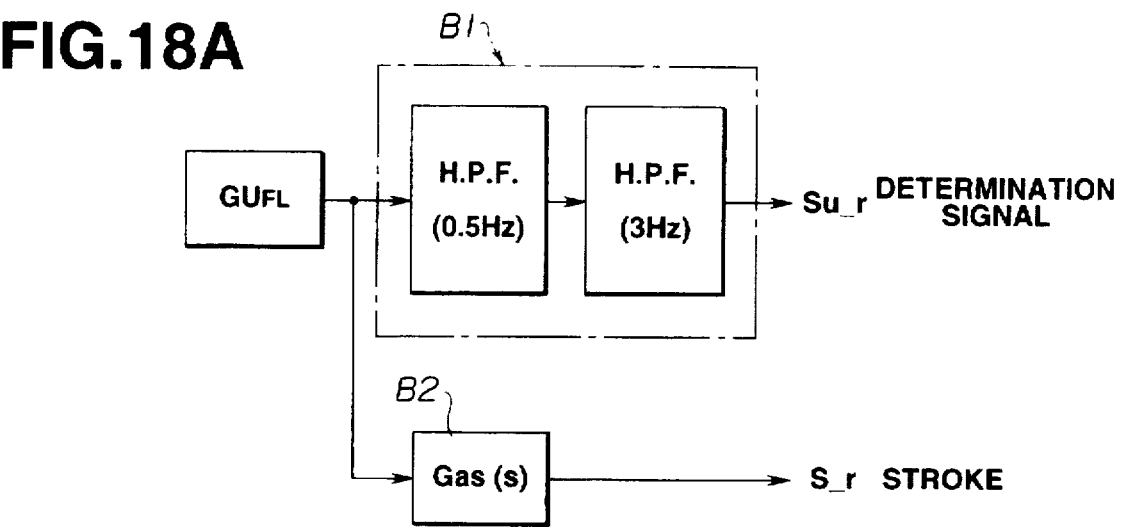
FIGS. 18A and 18B are partially circuit block diagrams for developing a determination signal in a second preferred embodiment of the damping force characteristic controlling apparatus according to the present invention.
Figure 18B:
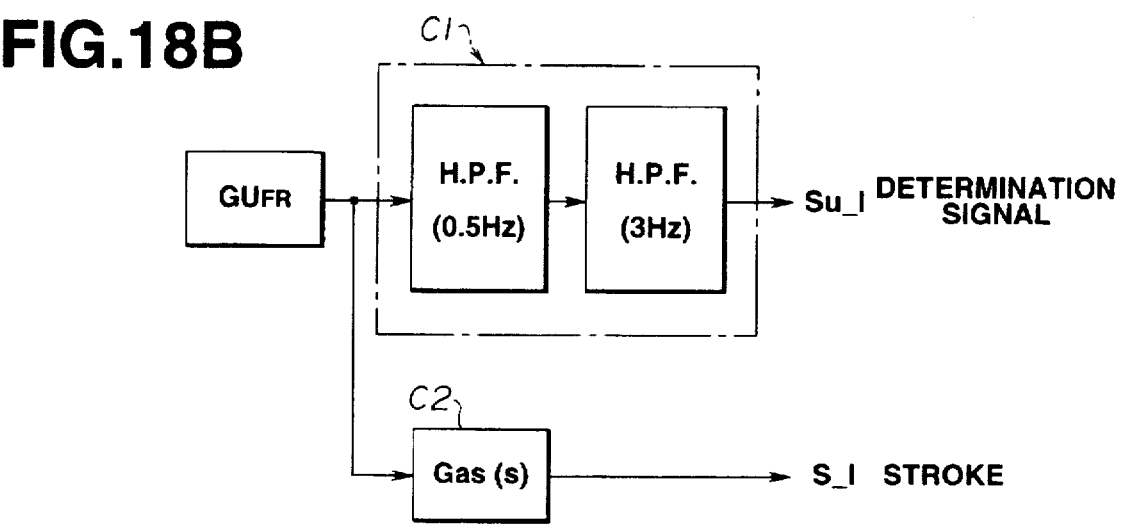

FIGS. 18A and 18B show circuit block diagram of signal processing circuits executed by the control unit 4 in which determination signals Gu-r and Gu-l are derived from the unsprung mass vertical acceleration signals $GU_{FL}$ and $GU_{FR}$ on the chassis 6 at the front left and right positions.

In FIGS. 18A and 18B, at blocks B1 and C1, the sprung mass resonant frequency components are extracted from the unsprung mass vertical accelerations $GU_{FL}$ and $GU_{FR}$ on the chassis 6 (the chassis 6 is the unsprung mass as viewed from the sprung mass, i.e., the cab 5) at the front left and right positions detected by means of the respective vertical G sensors $1_{FL}$ and $1_{FR}$. The extracted sprung mass resonant frequency components are supposed to be the determination signals Gu-l and Gu-r to start the corrective control.

At the subsequent blocks B2 and C2, strokes S-l and S-r are estimated on the basis of the transfer function Gds(s) from the unsprung mass vertical accelerations $GU_{FL}$ and $GU_{FR}$ on the chassis 6 at the front left and right positions detected by the respective vertical G sensors $1_{FL}$ and $1_{FR}$.

$$Gds(S) = G_{S(S)} \cdot GS_{(S)} \quad (22)$$
$$= (c \cdot s + k)/(m \cdot s^2 + c \cdot s + k) \cdot -m/(c \cdot s + k)$$
$$= -m/(m \cdot s^2 + c \cdot s + k)$$

It is noted that, in the equation (22), $G_{S(S)}$ denotes the transfer function from the unsprung mass vertical acceleration to the sprung mass vertical acceleration as described in the equation (1) and $GS_{(S)}$ denotes the transfer function $(-m/(c \cdot s+k)$ from the sprung mass to a relative displacement (stroke (x1−x2)).

Figure 19:
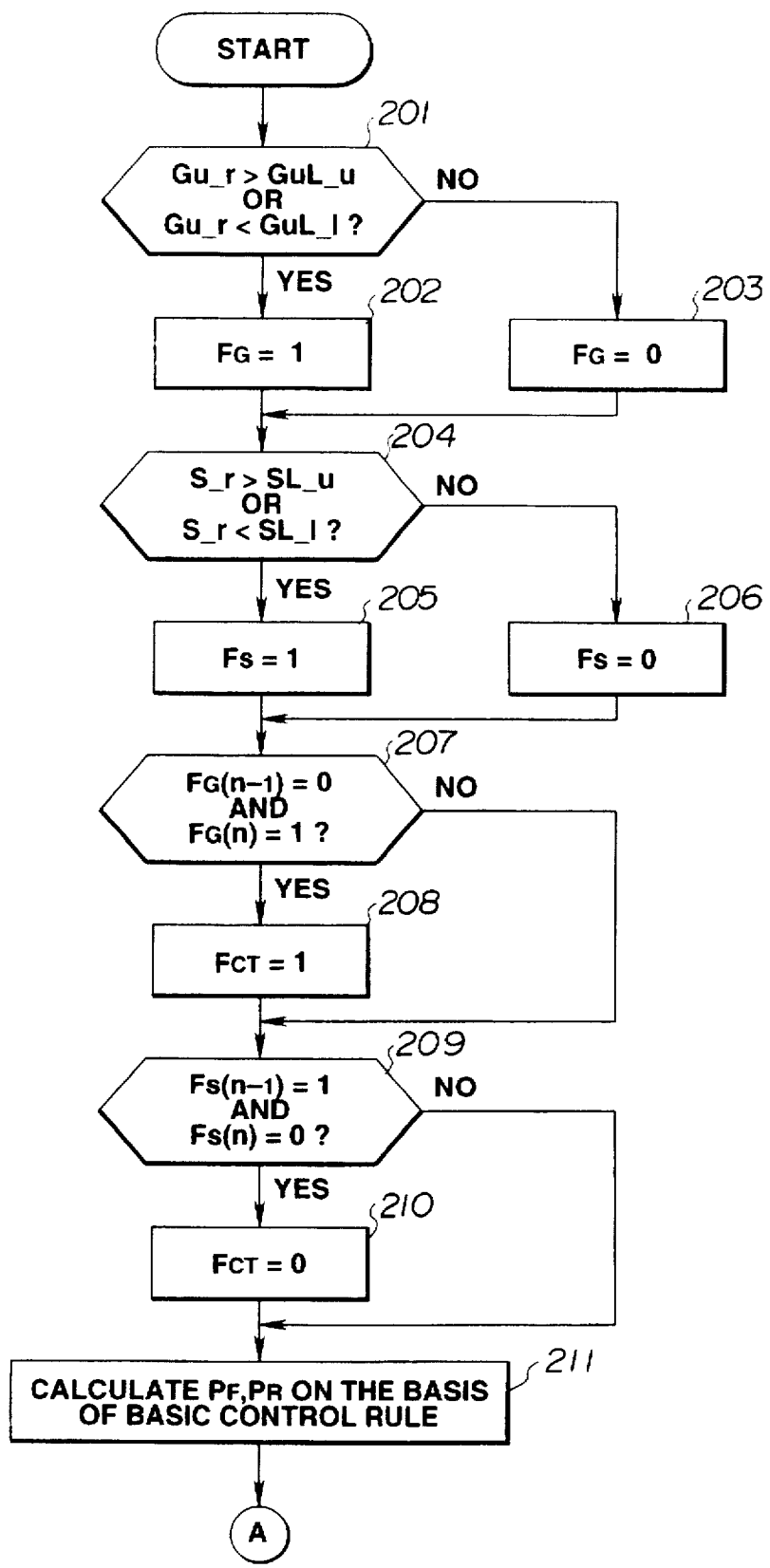
FIGS. 19 and 20 are integrally an operational flowchart executed by the control unit in the damping force characteristic controlling apparatus in the second embodiment shown in FIGS. 18A and 18B.
Figure 20:
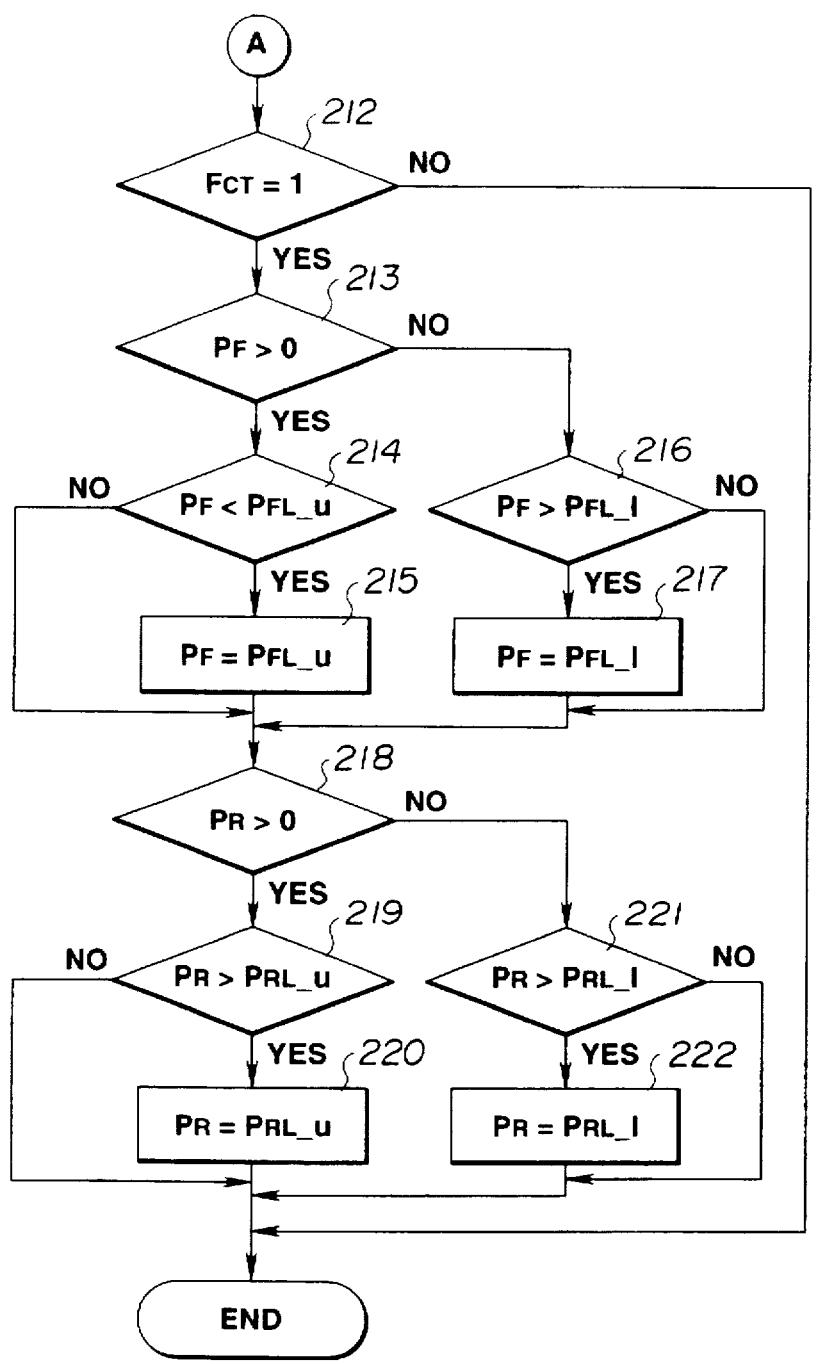
Figures 21A, 21B, 21C, 21D, 21E:
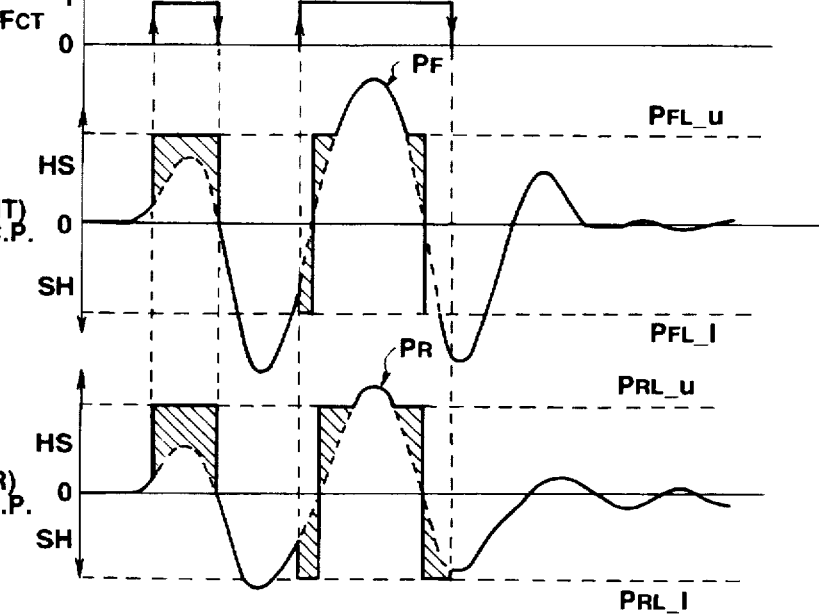

Next, FIGS. 19 and 20 show integrally the operational flowchart executed by means of the corrective control portion of the damping force characteristic controlling apparatus in the second embodiment.

FIGS. 21A through 21G integrally show the timing chart in the damping force characteristic controlling apparatus in the second embodiment.

It is noted that in FIGS. 19 to 21G the explanation will be given to the front and rear right shock absorbers $SA_{FR}$ and $SA_{RR}$.

At a step 201, the CPU 4b determines whether the determination signal Gu-r exceeds an extension phase unsprung mass threshold value GuL-u or determines whether the determination signal is below a compression phase unsprung mass threshold value GuL-l, namely, determines whether an amplitude of the determination signal Gu-r is in excess of a predetermined width. If Yes at the step 201, the routine of FIGS. 19 and 20 goes to a step 202 in which an unsprung mass G flag $F_G$ is rest to 1. If No at the step 201, the routine goes to a step 203 in which the unsprung mass G flag $F_G$ is reset to zero and the routine goes to a step 204.

At the step 204, the CPU 4b determines whether the stroke S-r exceeds an extension phase stroke threshold Sl-u or the stroke S-r is below a compression phase stroke threshold SL-l, namely, determines whether the stroke range is out of a predetermined range.

If Yes at the step 204, the routine goes to a step 205 in which a stroke flag Fs is set to 1 and the routine goes to a step 207. If No at the step 204, the routine goes to a step 205 in which the stroke flag $F_S$ is reset to zero and the routine goes to a step 207.

At the step 207, the CPU 4b determines whether the previous unsprung mass G flag $F_G(n-1)$ is reset to zero and the present unsprung mass G flag $F_G(n)$ is set to 1. If Yes at the step 207, the routine goes to a step 208 in which a stroke control flag $F_{CT}$ is set to 1 and the routine goes to a step 209. If No at the step 207, the routine jumps to the step 209.

At the step 209, the CPU 4b determines whether the previous stroke flag Fs(n-1) is set to 1 and the present stroke flag Fs(n) is reset to zero. If Yes at the step 209, the routine goes to a step 210 in which the stroke control flag $F_{CT}$ is reset to zero and the routine goes to a step 211. If No at the step 209, the routine jumps to the step 211.

At the step 211, the CPU 4b calculates the target damping force characteristic position $P_F$ for the front right shock absorber $SA_{FR}$ and the target damping force characteristic position $P_R$ of the rear right shock absorber $SA_{RR}$ on the basis of the basic control rule (the above-described equations (20) and (21)) described in the first embodiment and the routine goes to a step 212 of FIG. 20.

At the step 212, the CPU 4b determines whether the stroke control flag $F_{CT}$ is set to 1. If YES at the step 212, the routine goes to a step 213. If No at the step 212, the routine is ended.

At the step 213, the CPU 4b determines whether the target damping force characteristic position $P_F$ of the front side shock absorber $SA_{FR}$ is in excess of zero. If YES ($P_F>0$) at the step 213, the routine goes to a step 214. However, if No ($P_F<0$), the routine goes to a STEP 216.

At the step 214, the CPU 4b determines whether the target damping force characteristic position $P_F$ of the front right shock absorber $SA_{FR}$ is below the extension phase limit position $P_{FL-u}$. If Yes at the step 214, the routine goes to a step 215 in which the CPU 4b sets the target damping force characteristic position $P_F$ to an extension phase limit position $P_{FL-u}$ and thereafter the routine goes to a step 218. If No at the step 215, the routine jumps to the step 218.

On the other hand, at the step 216, the CPU 4b determines whether the target damping force characteristic position $P_F$ of the front right shock absorber $SA_{FR}$ is in excess of a compression phase limit position $P_{FL-l}$. If Yes at the step 216, the routine goes to a step 217 in which the CPU 4b sets the target damping force characteristic position $P_F$ of the front right shock absorber $SA_{FR}$ is in excess of the compression phase limit position $P_{FL-l}$ and the routine goes to the step 218. If No at the step 216, the routine jumps to the step 218.

At the step 218, the CPU 4b determines whether the target damping force characteristic position $P_R$ of the rear right shock absorber $SA_{RR}$ is in excess of zero.

If Yes ($P_R > 0$) at the step 218, the routine goes to a step 219. If No ($P_R \leq 0$) at the step 219, the routine goes to a step 221.

At the step 219, the CPU 4b determines whether the target damping force characteristic position of the rear right shock absorber $SA_{RR}$ is below the extension limit position $P_{RL-u}$. If Yes at the step 219, the routine goes to a step 220 in which the CPU 4b sets the target damping force characteristic position $P_R$ to the extension phase limit position $P_{RL-u}$. Then, the present routine is ended. If No at the step 219, the routine is ended.

On the other hand, at the step 221, the CPU 4b determines whether the target damping force characteristic position $P_R$ of the rear right shock absorber $SA_{RR}$ is in excess of the compression phase limit position $P_{RL-l}$. If Yes at the step 221, the routine goes to a step 222 in which the CPU 4b sets the target damping force characteristic position $P_R$ to the compression phase limit position $P_{RL-l}$ and the present routine is ended. If No at the step 221, the routine is ended.

Next, the content of the corrective control in the corrective control portion in the second embodiment of the damping force characteristic controlling apparatus will be described with reference to the timing chart of FIGS. 21A to 21G.

When the determination signal Gu-r based on the sprung mass resonant frequency band component from the unsprung mass vertical acceleration signal $GU_{FR}$ at te position of the front right shock absorber on the chassis 6 is in excess of the extension phase unsprung mass threshold value $G_{uL-u}$ or is below the compression phase unsprung mass threshold value $G_{uL-l}$, there is a possibility of occurring the extension limit over of the corresponding shock absorbers or the compression limit over thereof. Hence, at this time, the corrective control of the damping force characteristic position is started.

That is to say, in such a corrective control as described above, the target damping force characteristic position $P_F$ of the present front right shock absorber $SA_{FR}$ is in excess of the extension limit position $P_{FL-u}$ or is below the compression phase limit position $P_{FL-l}$, the target damping force characteristic position $P_F$ of the front right shock absorber $SA_{FR}$ is corrected and set to the extension phase limit position $P_{FL-u}$ or compression phase limit position $P_{FL-l}$ respectively. In addition, when the target damping force characteristic $P_R$ of the rear right shock absorber $SA_{RR}$ is below the extension phase limit position $P_{RL-u}$ or in excess of the compression phase limit position $P_{RL-l}$, the target damping force characteristic position $P_R$ of the rear right shock absorber $SA_{RR}$ is corrected and set to the extension phase or compression phase limit position $P_{RL-u}$ or $P_{RL-l}$.

As described hereinabove, since the damping force characteristic position of the shock absorber SA is corrected and set to the high limit position, a response delay at the time of the corrective control start can be prevented and the extension limit over or upward pressing of each shock absorber can be prevented.

An end of the corrective control as described above is carried out when the stroke S-r is below the extension phase stroke threshold $S_{L-u}$ or in excess of the compression phase threshold $S_{L-l}$, namely, when the extension phase limit over or the upward pressing of the shock absorber SA might occur.

As described above, in the damping force characteristic controlling apparatus in the second embodiment according to the present invention, the same advantages as those in the first embodiment can be achieved and, in addition, the response delay in the corrective control can be prevented and the extension phase limit over or upward pressing can be prevented.

In each of the first and second embodiments, the sprung mass vertical velocities and the relative velocities between the sprung mass and unsprung mass are used as the estimated vertical behavior on the cab. However, sprung mass vertical accelerations, sprung mass vertical displacement, relative acceleration between the sprung mass and unsprung mass may alternatively be estimated.

In each of the first and second preferred embodiments, the damping force characteristic exerting region of the corresponding one of the shock absorbers SA is controlled so as to enter the soft region SS only when the sprung mass vertical velocity signal is zero. However, a predetermined dead zone is provided in a vicinity to zero of the sprung mass vertical velocity so that the damping force characteristic exerting region is maintained at the soft region SS during the sprung mass vertical velocity moved in the predetermined dead zone, thus a control hunting being prevented from occurring.

It is noted that, in each embodiment, the shock absorber SA such that when the damping force characteristic on either of the extension or compression phase is variably controlled at the hard side, the damping force characteristic on the opposite phase is fixed to the soft characteristic. However, the damping force characteristic controlling apparatus can adapt the shock absorber SA having the structure such that the damping force characteristic of both extension and compression phases is varied simultaneously.

In each embodiment, the relative velocity between the sprung mass and unsprung mass is estimated using the transfer function from the sprung mass vertical acceleration, the relative velocity may be derived using a filter or may be derived actually derived from the truck, or may be derived using a sensor.

In the second embodiment, although the sprung mass resonant frequency component of the unsprung mass vertical acceleration signal at the front left and right positions on the chassis or relative displacement (stroke) between the sprung mass and unsprung mass may be used, either one of these may be used.

Since the cab has been controlled on the basis of the information from the chassis 6 in the previously proposed damping force characteristic controlling apparatus described in the BACKGROUND OF THE INVENTION, the accurate recognition of the behavior of the cab 5 cannot be made. To cope with this disadvantage, a sensor for directly detecting the vertical behavior of the cab 5 may be considered. However, since the road surface on which the cab over type truck runs and the cab 5 is separate from each other, the information on the running road surface is detected at the cab portion with a delay so that a quick control on the damping force characteristic cannot be made any more which is demanded in the damping force characteristic controlling apparatus.

In the case of the damping force characteristic controlling apparatus according to the present invention, the behavior of the cab is estimated from the information on the chassis so that a quicker control on the damping force characteristic than the detection of the behavior on the cab can be achieved (feedforward control).

It is finally noted that, in FIGS. 21F and 21G, T.D.F.C.P. denotes the target damping force characteristic position.

What is claimed is:

1. An apparatus for a cab over type truck, comprising:
   a) at least one shock absorber interposed between a vehicle cab of the truck and a vehicle chassis of the truck and having a damping force characteristic varying member arranged to enable a variation in the damping force characteristic of the shock absorber in response to a control signal;
   b) a vertical behavior sensor arranged on the vehicle chassis of the truck for detecting a vertical behavior on the chassis; and
   c) a control unit arranged for estimating the vertical behavior on the cab of the truck from the detected vertical behavior on the chassis, wherein the detected vertical behavior on the chassis is the only detected vertical behavior used in estimating the vertical behavior on the cab of the truck, and wherein the control unit provides a control signal for the shock absorber on the basis of the estimated vertical behavior on the cab of the truck.

2. An apparatus for a cab over type truck as claimed in claim 1, wherein said control unit estimates the vertical behavior on the cab of the truck from the detected vertical behavior on the chassis using a predetermined transfer function.

3. An apparatus for a cab over type truck as claimed in claim 2, wherein said vertical behavior sensor comprises a vertical acceleration sensor arranged for detecting a vertical acceleration on the chassis.

4. An apparatus for a cab over type truck as claimed in claim 3, wherein the estimated vertical behavior on the cab is a vertical acceleration on the cab.

5. An apparatus for a cab over type truck as claimed in claim 3, wherein the estimated behavior on the cab is a relative acceleration between the cab and the chassis.

6. An apparatus for a cab over type truck as claimed in claim 4, wherein said control unit is arranged for generating a determination signal based on the vertical behavior on the chassis detected by the vertical behavior sensor and for determining whether the generated determination signal exceeds a predetermined threshold value and wherein said control unit is operated so as to correct the damping force characteristic of the shock absorber in a phase into which the shock absorber strokes to a hard damping force when determining that the determination signal exceeds the predetermined threshold value.

7. An apparatus for a cab over type truck as claimed in claim 5, wherein said control unit is arranged for generating a determination signal based on the vertical behavior on the chassis detected by the vertical behavior sensor and for determining whether the generated determination signal exceeds a predetermined threshold value and wherein said control unit is operated so as to correct the damping force characteristic of the shock absorber in a phase into which the shock absorber strokes to a hard damping force when determining that the determination signal exceeds the predetermined threshold value.

8. An apparatus for a cab over type truck as claimed in claim 6, wherein a component of the detected vertical behavior on the chassis is a cab resonant frequency band which is used as the determination signal.

9. An apparatus for a cab over type truck as claimed in claim 7, wherein a component of the detected vertical behavior on the chassis is a cab resonant frequency band which is used as the determination signal.

10. An apparatus for a cab over type truck as claimed in claim 6, wherein a relative displacement between the chassis and the cab derived by the control unit from the vertical behavior on the chassis is used as the determination signal.

11. An apparatus for a cab over type truck as claimed in claim 7, wherein a relative displacement between the chassis and the cab derived by the control unit from the vertical behavior on the chassis is used as the determination signal.

12. An apparatus for a cab over type truck as claimed in claim 6, wherein either or both of the component and the relative displacement are used as the determination signal and wherein said control unit starts the correction of the damping force characteristic when a starting condition of the corrective control is established and said control unit ends the correction of the damping force characteristic when an end condition of the corrective control is established.

13. An apparatus for a cab over type truck as claimed in claim 7, wherein either or both of the component and the relative displacement are used as the determination signal and wherein said control unit starts the correction of the damping force characteristic when a starting condition of the corrective control is established and said control unit ends the correction of the damping force characteristic when an end condition of the corrective control is established.

14. An apparatus for a cab over type truck as claimed in claim 13, wherein the estimated vertical behavior on the cab is an estimated vertical velocity on the cab or the same estimated from the estimated vertical behavior and wherein said damping force characteristic varying member provides a soft region (SS) for the shock absorber in which both extension and compression phases are soft damping force characteristics, provides an extension phase hard region (HS) in which the damping force characteristic in the extension phase is varied to the hard damping force characteristic with the damping force characteristic in the compression phase maintained at the soft damping force characteristic, and provides a compression phase hard region (SH) in which the damping force characteristic in the compression phase is varied to the hard damping force characteristic with the damping force characteristic in the extension phase maintained at the soft damping force characteristic and wherein said control unit controls the damping force characteristic of the shock absorber so as to provide the soft region (SS) when a direction discrimination sign of the control signal based on the vertical velocity on the cab is placed in the vicinity to zero, so as to provide the extension hard region (HS) when the direction discrimination sign of the control signal based on the vertical velocity on the cab indicates a positive, and so as to provide the compression hard region (SH) when the direction discrimination sign of the control signal based on the vertical velocity on the cab indicates a negative.

15. An apparatus for a cab over type truck, comprising:
   a) a plurality of shock absorbers interposed between a vehicle cab of the truck and a vehicle chassis, each shock absorber having a damping force characteristic varying member arranged to enable a variation in the damping force characteristic of the shock absorber in response to a control signal;
   b) a plurality of vertical acceleration sensors, each arranged on the chassis of the truck for detecting a vertical acceleration on the chassis of the truck; and
   c) a control unit arranged for estimating respective vertical velocities on the cab of the truck and respective relative velocities between the chassis of the truck and the cab of the truck from the detected vertical acceleration on the chassis of the truck, wherein the detected vertical acceleration on the chassis of the truck is the only detected vertical acceleration used in estimating the vertical velocities on the cab of the truck, and wherein the control unit provides control signals for the respective shock absorbers to control the damping force characteristics of the respective shock absorbers on the basis of the estimated vertical velocities on the cab and the estimated relative velocities between the chassis and the cab.

16. An apparatus for a cab over type truck as claimed in claim 15, wherein said vertical acceleration sensors are mounted respectively on front left and right parts of the chassis of the truck adjacent to the respectively corresponding shock absorbers and wherein said control unit calculates sprung mass vertical accelerations ($G_{FL}$, $G_{FR}$) on the cab of the truck as a function of a first transfer function ($G_S(S)$) from an unsprung mass vertical acceleration (x2f) to a sprung mass vertical acceleration (x1f).

17. An apparatus for a cab over type truck as claimed in claim 16, wherein said first transfer function GS(S) is expressed as follows:

$G_S(S) = (cf.s+kf)/(mf.s^2+cf.s+kf)$, wherein $m.x1 = -k(x1-x2)-c\ (\Delta x1-\Delta x2)$ and wherein cf denotes a damping coefficient on each of the front left and right shock absorbers, cr denotes a damping coefficient on each of the rear left and right shock absorbers, mf denotes a sprung mass of a front side cab, mr denotes a sprung mass of a rear side cab, kf denotes a spring constant of the front left and right shock absorbers, kr denotes a spring constant of the rear left and right shock absorbers, x2f denotes a front side unsprung mass vertical acceleration, x2r denotes a rear side unsprung mass vertical acceleration, Δx1f denotes a front side vertical velocity, and Δx1r denotes a rear side vertical velocity.

18. An apparatus for a cab over type truck as claimed in claim 17, wherein said control unit calculates a bouncing rate ($G_{BF}$) on a center position between the respective front left and right shock absorbers ($SA_{FL}$, $SA_{FR}$) on the cab from the calculated sprung mass vertical accelerations ($G_{FL}$, $G_{FR}$) on the cab as follows:

$G_{BF} = (G_{FR}+G_{FL})/2$ and wherein said control unit calculates a bouncing rate ($G_{BF}$) on a center position between the respective front left and right shock absorbers ($SA_{RL}$, $SA_{RR}$) on the cab from the estimated sprung mass vertical accelerations ($G_{RR}+G_{RL})/2$ with a predetermined gain (αb).

19. An apparatus for a cab over type truck as claimed in claim 18, wherein said control unit calculates a roll rate ($G_{RF}$) on a front part of the cab from the sprung mass vertical accelerations ($G_{FL}$, $G_{FR}$) on the cab at the positions at which the front left and right shock absorbers ($SA_{FL}$, $SA_{FR}$) are mounted using the following equation:

$G_{RF}=(G_{FR}-G_{FL})/2$ and wherein said control unit calculates a roll rate ($G_{RR}$) on a rear part of the cab from the calculated roll rate ($G_{RF}$) on the front part of the cab with a predetermined gain αr.

20. An apparatus for a cab over type truck as claimed in claim 19, wherein said control unit derives sprung mass vertical acceleration signals ($G_{-FR}$, $G_{-FL}$, $G_{-RR}$, $G_{-RL}$) at the positions at which the respective shock absorbers are mounted as follows:

$G_{-FR}=G_{BF}+G_{RF}$ $G_{-FL}=G_{BF}-G_{RF}$ $G_{-RR}=G_{BR}+G_{RR}$ $G_{-RL}=G_{BR}-G_{RR}$.

and wherein said control unit calculates a bouncing component $G_B$, a pitching component $G_P$, and a rolling component $G_R$ at the cab as follows:

$G_B=(G_{-FR}+G_{-FL}+G_{-RR}+G_{-RL})/4$.

$G_P=\{(G_{-FR}+G_{-FL})-(G_{-RR}+G_{-RL})\}/4$.

and $G_R=(G_{-FR}-G_{-FL})/2$.

21. An apparatus for a cab over type truck as claimed in claim 20, wherein said control unit derives sprung mass vertical velocity related bouncing component $V_B$, sprung mass vertical velocity related rolling component $V_R$, and sprung mass vertical velocity related pitching component $V_P$ using the following second transfer function from the bouncing component $G_B$, the pitching component $G_P$, and the rolling component $G_R$ and using a predetermined band pass filter from the calculated bouncing component $G_B$, the pitch component $G_P$, and the roll component $G_R$: $G(S)=(0.001S+1)/(10S+1)\times\gamma$, $\gamma=10$ and S denotes a complex variable in the Laplace transformation.

22. An apparatus for a cab over type truck as claimed in claim 21, wherein said control unit calculates sprung mass vertical velocity signals ΔxFL, ΔxFR, ΔxRL, and ΔxRR as follows:

$\Delta xFL=V_B+V_P-V_R$, $\Delta xFR=V_B+V_P+V_R$, $\Delta xRL=V_B-V_P-V_R$, and $\Delta xRR=V_B-V_P+V_R$, and wherein said control unit derives relative velocities $((\Delta x-\Delta x0)_{FL}$, $(\Delta x-\Delta x0)_{FR}$, $(\Delta x-\Delta x0)_{RL}$, $(\Delta x-\Delta x0)_{RR})$ between the cab and the chassis at the positions at which the respective shock absorbers ($SA_{FL}$, $SA_{FR}$, $SA_{RL}$, and $SA_{RR}$) are mounted using the following third transfer functions:

$Guf(S)=-mf.s/(cf.s+kf)$, and $Gur(S)=-mr.s/(cr.s+kr)$.

23. A method for a cab over type truck having at least one shock absorber interposed between a vehicle cab and a vehicle chassis and having a damping force characteristic varying member arranged to enable a variation in a damping force characteristic of the shock absorber in response to a control signal, comprising the steps of:

a) detecting a vertical behavior on the chassis;

b) estimating a vertical behavior on the cab from the detected vertical behavior on the chassis, wherein the detected vertical behavior on the chassis is the only detected vertical behavior used in estimating the vertical behavior on the cab;

c) providing the control signal for the shock absorber to control the damping force characteristic of the shock absorber on the basis of the estimated vertical behavior on the cab of the truck.

* * * * *